United States Patent
Terada et al.

(10) Patent No.: US 10,341,652 B2
(45) Date of Patent: *Jul. 2, 2019

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Kengo Terada, Osaka (JP); Youji Shibahara, Tokyo (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,487

(22) Filed: Nov. 27, 2017

(65) Prior Publication Data

US 2018/0077412 A1   Mar. 15, 2018

Related U.S. Application Data

(63) Continuation of application No. 14/824,291, filed on Aug. 12, 2015, now Pat. No. 9,866,830, which is a (Continued)

(51) Int. Cl.
*H04N 19/00* (2014.01)
*H04N 19/103* (2014.01)
(Continued)

(52) U.S. Cl.
CPC ......... *H04N 19/103* (2014.11); *H04N 19/136* (2014.11); *H04N 19/176* (2014.11);
(Continued)

(58) Field of Classification Search
CPC ... H04N 7/50; H04N 7/26244; H04N 7/26271
See application file for complete search history.

(56) References Cited

U.S. PATENT DOCUMENTS 8,233,544 B2    7/2012   Bao et al.
2008/0013622 A1  1/2008   Bao et al.
(Continued)

FOREIGN PATENT DOCUMENTS

EP   2 856 758    4/2015
JP   2009-544196  12/2009

OTHER PUBLICATIONS

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d1, (Ver.2), 9th Meeting: Geneva, CH, Apr. 27-May 7, 2012.

(Continued)

*Primary Examiner* — Frank F Huang
(74) *Attorney, Agent, or Firm* — Wenderoth, Lind & Ponack, L.L.P.

(57) ABSTRACT

An image coding method includes: performing Sample SAO processing on Y signal, Cb signal, and Cr signal which are included in a target block; performing arithmetic coding on a first flag indicating whether or not an SAO parameter, which indicates details of the SAO processing, of the target block is identical to an SAO parameter for a left neighboring block immediately left of the target block; and performing arithmetic coding on the SAO parameter for the target block, when the SAO parameter for the target block is different from the SAO parameter for the left neighboring block. In the arithmetic coding on the first flag, a single context is used
(Continued)

to perform the arithmetic coding on the first flag for the luminance signal, the chrominance Cb signal, and the chrominance Cr signal.

1 Claim, 34 Drawing Sheets

Related U.S. Application Data continuation of application No. 13/899,733, filed on May 22, 2013, now Pat. No. 9,143,779.

(60) Provisional application No. 61/651,719, filed on May 25, 2012.

(51) Int. Cl.

| | | |
|---|---|---|
| *H04N 19/91* | (2014.01) | |
| *H04N 19/82* | (2014.01) | |
| *H04N 19/136* | (2014.01) | |
| *H04N 19/176* | (2014.01) | |
| *H04N 19/186* | (2014.01) | |
| *H04N 19/70* | (2014.01) | |

(52) U.S. Cl.
CPC ........... *H04N 19/186* (2014.11); *H04N 19/70* (2014.11); *H04N 19/82* (2014.11); *H04N 19/91* (2014.11)

(56) References Cited

U.S. PATENT DOCUMENTS

| | | |
|---|---|---|
| 2013/0251032 A1 | 9/2013 | Tanaka |
| 2013/0259118 A1 | 10/2013 | Fu |
| 2013/0266058 A1* | 10/2013 | Minoo et al. ............ 375/240.02 |
| 2013/0329784 A1* | 12/2013 | Chuang et al. .......... 375/240.02 |

OTHER PUBLICATIONS

Chih-Wei Hsu, "Non-CE1: Decoupling SAO on/off from SAO type with neighbor-based contexts", Joint Collaborative Team on Video Coding (JCT-VC) of ITU-T SG16 WP3 and ISO/IEC JTC1/SC29/WG11, JCTVC-I0199, ITU-T, Apr. 27, 2012, pp. 1-5.
Elena Alshina, "Non-CE1: On SAO Type sharing between color component", Joint Collaborative Team on Video Coding (JCT-VC) of ITU-T SG16 WP3 and ISO/IEC JTC1/SC29/WG11, JCTVC-0590, ITU-T, May 2, 2012, pp. 1-10.
Woo-Shik Kim, "Evaluation of combination of LCU SAO enable flag coding methods", Joint Collaborative Team on Video Coding (JCT-VC) of ITU-T SG16 WP3 and ISO/IEC JTC1/SC29/WG11, JCTVC-I0601, ITU-T, May 5, 2012, pp. 1-7.
International Search Report dated Aug. 20, 2013 in International (PCT) Application No. PCT/2013/003185.
Search Report and Written Opinion dated Nov. 19, 2015 in Singapore Patent Application No. 2013094016.
Minoo et al., "Non-CE1: Coding of SAO merge left and merge up", Joint Collaborative Team on Video Coding (JCT-VC) of ITU-T SG16 WP3 and ISO/IEC JTC1/SC29/WG11, JCTVC-I0507, 9th Meeting: Geneva, CH, Apr. 27-May 7, 2012.
Maani et al., "SAO Type Coding Simplification", Joint Collaborative Team on Video Coding (JCT-VC) of ITU-T SG16 WP3 and ISO/IEC JTC1/SC29/WG11, JCTVC-I0246, 9th Meeting: Geneva, CH, Apr. 27-May 7, 2012.
Bross B et al: "High Efficiency Video Coding (HEVC) text specification draft 7" 9. JCT-VC Meeting; 100 MPEG Meeting; Apr. 27, 2012-May 7, 2012; Geneva; (Joint Collaborative Team on Video Coding of ISO/IEC JTC1/SC29/WG11 and ITU-T SG.16); JCTVC-I1003, May 10, 2012, XP030112373.
Alshina E et al.: "AHG5/AHG6: On reducing context models for SAO merge syntax", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); JCTVC-J0041, Jun. 26, 2012, XP030112403.
Matsunobu T et al: "AHG5/AHG6: Bypass coding for SAO syntax elements", 101. MPEG Meeting; Jul. 16, 2012-Jul. 20, 2012; Stockholm; (Motion Picture Expert Group or ISO/IEC JTC1/SC29/WG11), JCTVC-J0148, m25471, Jul. 11, 2012, XP030053805.
Office Action and Search Report dated May 2, 2017 in Chinese Patent Application No. 201380001841.8, with English-language translation of Search Report.
Chuang et al., "Architecture Design of Fine Grain Quality Scalable Encoder with CABAC for H.264/AVC Scalable Extension", Journal of Signal Processing Systems, vol. 60, Issue 3, Sep. 2010, pp. 363-375.
Non-CE1: Decoupling SAO on/off from SAO type with neighbor-based contexts, Joint Collaborative Team on Video Coding (JCT-VC) of ITU-T SG16 WP3 and ISO/IEC JTC1/SC29/WG11, 9th meeting: Geneva, CH, Apr. 27, 2012-May 7, 2012. JCTVC-I0199, pp. 1-6.
Bross et al., "High efficiency video coding (HEVC) text specification draft 6", Joint Collaborative Team on Video Coding (JCT-VC) of ITU-T SG16 WP3 and ISO/IEC JTC1/SC29/WG11, 8th Meeting: San Jose, CA, Feb. 1-10, 2012, JCTVC-H1003_dK.

* cited by examiner

FIG. 8

| | Main | | | | | | | | | HE10 | | | | | | | | | |
| --- | --- | --- | --- | --- | --- | --- | --- | --- | --- | --- | --- | --- | --- | --- | --- | --- | --- | --- |
| | AI | | | RA | | | LB | | | AI | | | RA | | | LB | | |
| | Y | Cb | Cr | Y | Cb | Cr | Y | Cb | Cr | Y | Cb | Cr | Y | Cb | Cr | Y | Cb | Cr |
| Embodiment 1 | 0.0 | 0.0 | 0.0 | 0.0 | 0.1 | -0.1 | -0.1 | 0.0 | 0.0 | 0.0 | 0.0 | 0.0 | 0.0 | -0.1 | -0.1 | 0.0 | -0.1 | 0.1 |
| Variation 1 | 0.0 | 0.0 | 0.0 | -0.1 | -0.2 | -0.3 | 0.0 | -0.1 | 0.0 | 0.0 | 0.0 | 0.0 | 0.0 | -0.1 | -0.1 | 0.0 | -0.1 | 0.1 |

FIG. 22

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

FIELD

One or more exemplary embodiments disclosed herein relate to image coding methods and image decoding methods, and more particularly to arithmetic coding and arithmetic decoding on Sample Adaptive Offset (SAO) parameters.

BACKGROUND

In recent years, with the rapid advance of digital video apparatus technologies, there have been more opportunities for compression-coding video signals (time-series moving pictures) and recording the resulting video signals to a recording medium such as a Digital Versatile Disc (DVD) or a hard disk or distributing them on the net. An example of image coding standards is H.264/AVC (MPEG-4 AVC). High Efficiency Video Coding (HEVC) standard has recently been examined as a new-generation standard (see Non Patent Literature 1, for example).

CITATION LIST

Patent Literature

[Non Patent Literature 1] Joint Collaborative Team on Video Coding (JCT-VC) of ITU-T SG16 WP3 and ISO/IEC JTC1/SC29/WG11 9th Meeting: Geneva, CH, 27 Apr.-7 May 2012 JCTVC-I1003, Title: High efficiency video coding (HEVC) text specification draft 7 http://phenix.it-sudparis. eu/jct/doc_end_user/documents/9_Geneva/wg11/JCTVC-I1003-v2. zip

SUMMARY

Technical Problem

For such image coding method and image decoding method, it has been demanded to reduce a processing amount while suppressing deterioration of coding efficiency.

One non-limiting and exemplary embodiment provides an image coding method and an image decoding method each capable of reducing a processing amount while suppressing deterioration of coding efficiency.

Solution to Problem

In one general aspect, the techniques disclosed here feature an image coding method, including: performing Sample Adaptive Offset (SAO) processing on a luminance signal, a chrominance Cb signal, and a chrominance Cr signal which are included in a target block to be coded; performing arithmetic coding on a first flag indicating whether or not an SAO parameter for the target block is identical to an SAO parameter for a left neighboring block immediately left of the target block, the SAO parameter for the target block indicating details of the SAO processing; and performing arithmetic coding on the SAO parameter for the target block, when the SAO parameter for the target block is different from the SAO parameter for the left neighboring block, wherein, in the performing of the arithmetic coding on the first flag, the arithmetic coding is performed on the first flag for the luminance signal, the chrominance Cb signal, and the chrominance Cr signal by using a single context.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One non-limiting and exemplary embodiment provides an image coding method and an image decoding method each capable of reducing a processing amount while suppressing deterioration of coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a table showing evaluation results of the image coding method according to Embodiment 1.

FIG. 22 illustrates a structure of multiplexed data.

FIG. 33 shows an example of a look-up table in which video data standards are associated with driving frequencies.

DESCRIPTION OF EMBODIMENT(S)

Figure 1:
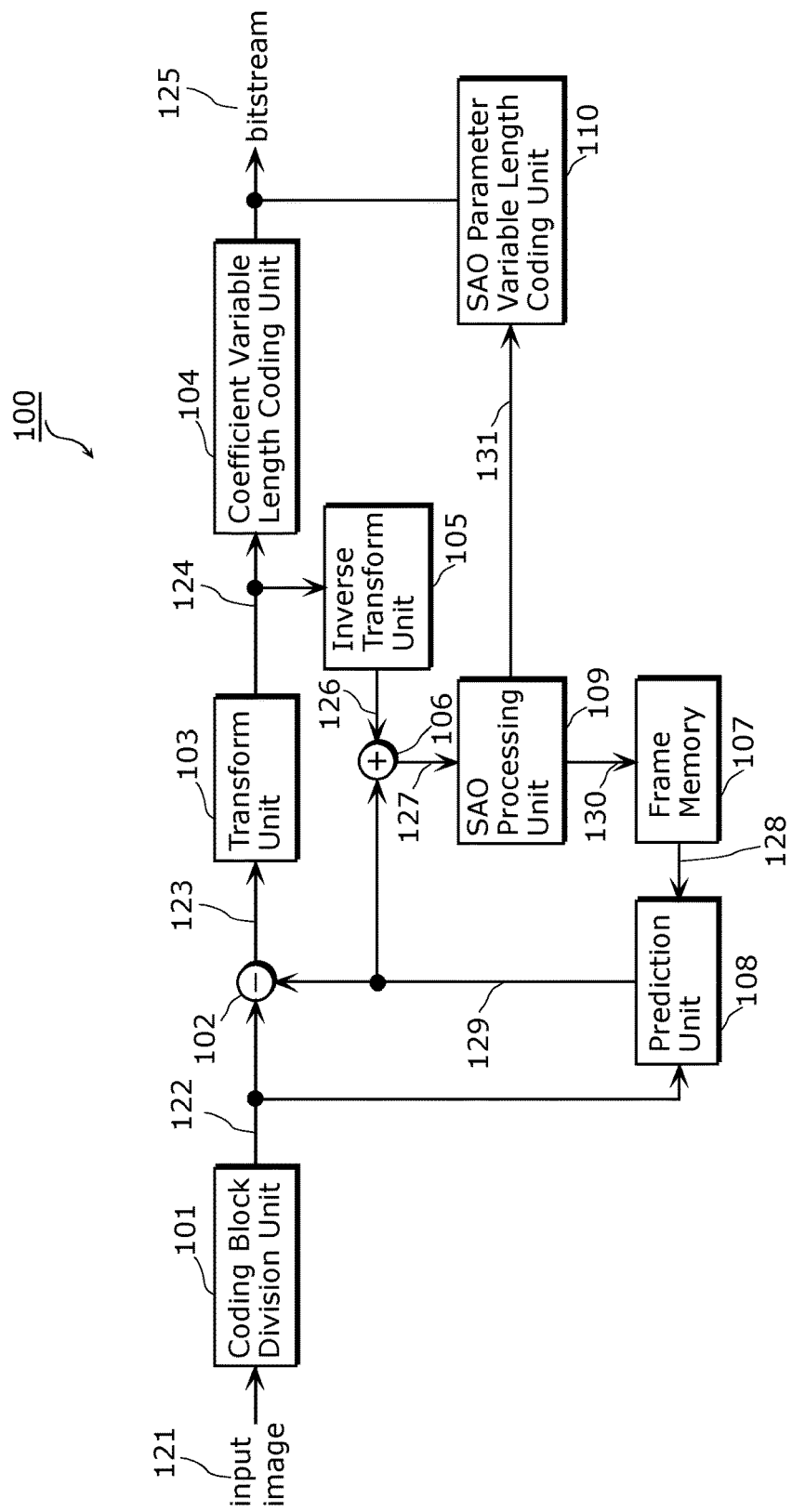
FIG. 1 is a block diagram of an image coding apparatus according to Embodiment 1.

(Underlying Knowledge Forming Basis of the Present Disclosure)

In relation to the conventional image coding method, the inventors have found the following problem.

The present HEVC standard (Non Patent Literature 1) defines processing called Sample Adaptive Offset (SAO) processing. In the SAO processing, a corresponding offset value is added to each of pixels in an image generated by decoding a bitstream. The SAO processing is capable of more faithfully reproducing an original image that has not yet been coded, and eventually reducing image quality deterioration caused by coding.

In arithmetic coding according to the HEVC standard, an image coding apparatus selects a context for each signal to be coded. A symbol occurrence probability is determined based on the selected context.

However, the inventors have found that the conventional method needs a large number of contexts in the arithmetic coding, and therefore causes a memory to have a size large enough to hold the contexts.

In order to solve the above problem, according to an exemplary embodiment disclosed herein, an image coding method, including: performing Sample Adaptive Offset (SAO) processing on a luminance signal, a chrominance Cb signal, and a chrominance Cr signal which are included in a target block to be coded; performing arithmetic coding on a first flag indicating whether or not an SAO parameter for the target block is identical to an SAO parameter for a left neighboring block immediately left of the target block, the SAO parameter for the target block indicating details of the SAO processing; and performing arithmetic coding on the SAO parameter for the target block, when the SAO parameter for the target block is different from the SAO parameter for the left neighboring block, wherein, in the performing of the arithmetic coding on the first flag, the arithmetic coding is performed on the first flag for the luminance signal, the chrominance Cb signal, and the chrominance Cr signal by using a single context.

In this way, the image coding method uses a single context in performing arithmetic coding on the first flag for a luminance signal, a chrominance Cb signal, and a chrominance Cr signal. As a result, the image coding method is capable of decreasing the number of using contexts in comparison to the case where different contexts are used to perform arithmetic coding on the first flag for a luminance signal, a chrominance Cb signal, and a chrominance Cr signal. In addition, the image coding method is capable of reducing a processing amount. Thus, the image coding method is capable of reducing a processing amount while deterioration of coding efficiency is suppressed.

For example, it is possible that the image coding method further includes performing arithmetic coding on a second flag indicating whether or not the SAO parameter for the target block is identical to an SAO parameter for an upper neighboring block immediately above the target block, wherein, in the performing of the arithmetic coding on the first flag and the performing of the arithmetic coding on the second flag, a same context determination method is used to determine both: a context to be used in the arithmetic coding on the first flag; and a context to be used in the arithmetic coding on the second flag.

In the image coding method, the same context determination method is used for the first flag and the second flag. As a result, the same circuit can be shared by the first flag and the second flag. As a result, the image coding apparatus can be simplified.

For example, it is also possible that in the performing of the arithmetic coding on the first flag, a single context is used to perform arithmetic coding on: a luminance first flag that is the first flag for the luminance signal; a Cb first flag that is the first flag for the chrominance Cb signal; and a Cr first flag that is the first flag for the chrominance Cr signal.

For example, it is further possible that in the performing of the arithmetic coding on the first flag, a single context is used to perform the arithmetic coding on a single first flag shared by the luminance signal, the chrominance Cb signal, and the chrominance Cr signal.

For example, it is still further possible that in the performing of the SAO processing, each of pixels included in the target block is classified to one of categories, the each of the pixels is added with an offset value corresponding to the classified one of the categories, and the SAO parameter includes: information indicating a method of classifying to the categories; and information indicating the offset value.

According to another exemplary embodiment disclosed herein, an image decoding method, including: performing arithmetic decoding on a first flag indicating whether or not an SAO parameter for a target block to be decoded is identical to an SAO parameter for a left neighboring block immediately left of the target block, the SAO parameter for the target block indicating details of Sample Adaptive Offset (SAO) processing; performing arithmetic decoding on the SAO parameter for the target block, when the first flag indicates that the SAO parameter for the target block is different from the SAO parameter for the left neighboring block; and performing, according to the first flag, SAO processing on a luminance signal, a chrominance Cb signal, and a chrominance Cr signal which are included in the target block, by using one of: the SAO parameter for the target block which has been applied with the arithmetic decoding; and the SAO parameter for the left neighboring block, wherein, in the performing of the arithmetic decoding on the first flag, a single context is used to perform the arithmetic decoding on the first flag for the luminance signal, the chrominance Cb signal, and the chrominance Cr signal.

In this way, the image decoding method uses a single context in performing arithmetic decoding on the first flag or a luminance signal, a chrominance Cb signal, and a chrominance Cr signal. As a result, the image decoding method is capable of decreasing the number of using contexts in comparison to the case where different contexts are used to perform arithmetic decoding on the first flag for a luminance signal, a chrominance Cb signal, and a chrominance Cr signal. In addition, the image decoding method is capable of reducing a processing amount. Thus, the image decoding method is capable of reducing a processing amount while deterioration of coding efficiency is suppressed.

For example, it is possible that the image decoding method further includes performing arithmetic decoding on a second flag indicating whether or not the SAO parameter for the target block is identical to an SAO parameter for an upper neighboring block immediately above the target block, wherein, in the performing of the arithmetic decoding on the first flag and the performing of the arithmetic decoding on the second flag, a same context determination method is used to determine both: a context to be used in the arithmetic decoding on the first flag; and a context to be used in the arithmetic decoding on the second flag.

In the image decoding method, the same context determination method is used for the first flag and the second flag, so that the same circuit can be shared by the first flag and the second flag. As a result, the image decoding apparatus can be simplified.

For example, it is also possible that in the performing of the arithmetic decoding on the first flag, a single context is used to perform arithmetic decoding on: a luminance first flag that is the first flag for the luminance signal; a Cb first flag that is the first flag for the chrominance Cb signal; and a Cr first flag that is the first flag for the chrominance Cr signal.

For example, it is further possible that in the performing of the arithmetic decoding on the first flag, a single context is used in the arithmetic decoding on a single first flag for the luminance signal, the chrominance Cb signal, and the chrominance Cr signal.

For example, it is still further possible that in the performing of the SAO processing, each of pixels included in the target block is classified to one of categories, the each of the pixels is added with an offset value corresponding to the classified one of the categories, and the SAO parameter includes: information indicating a method of classifying to the categories; and information indicating the offset value.

According to still another exemplary embodiment disclosed herein, an image coding apparatus, including: control circuitry; and storage accessible from the control circuitry, wherein the control circuitry executes the image coding method including: performing Sample Adaptive Offset (SAO) processing on a luminance signal, a chrominance Cb signal, and a chrominance Cr signal which are included in a target block to be coded; performing arithmetic coding on a first flag indicating whether or not an SAO parameter for the target block is identical to an SAO parameter for a left neighboring block immediately left of the target block, the SAO parameter for the target block indicating details of the SAO processing; and performing arithmetic coding on the SAO parameter for the target block, when the SAO parameter for the target block is different from the SAO parameter for the left neighboring block, wherein, in the performing of the arithmetic coding on the first flag, the arithmetic coding is performed on the first flag for the luminance signal, the chrominance Cb signal, and the chrominance Cr signal by using a single context.

With this, the image coding apparatus uses a single context in performing arithmetic coding on the first flag for a luminance signal, a chrominance Cb signal, and a chrominance Cr signal. As a result, the image coding apparatus is capable of decreasing the number of using contexts in comparison to the case where different contexts are used to perform arithmetic coding on the first flag for a luminance signal, a chrominance Cb signal, and a chrominance Cr signal. In addition, the image coding apparatus is capable of reducing a processing amount. Thus, the image coding apparatus is capable of reducing a processing amount while deterioration of coding efficiency is suppressed.

According to still another exemplary embodiment disclosed herein, an image decoding apparatus, including: control circuitry; and storage accessible from the control circuitry, wherein the control circuitry executes the image decoding method, including: performing arithmetic decoding on a first flag indicating whether or not an SAO parameter for a target block to be decoded is identical to an SAO parameter for a left neighboring block immediately left of the target block, the SAO parameter for the target block indicating details of Sample Adaptive Offset (SAO) processing; performing arithmetic decoding on the SAO parameter for the target block, when the first flag indicates that the SAO parameter for the target block is different from the SAO parameter for the left neighboring block; and performing, according to the first flag, SAO processing on a luminance signal, a chrominance Cb signal, and a chrominance Cr signal which are included in the target block, by using one of: the SAO parameter for the target block which has been applied with the arithmetic decoding; and the SAO parameter for the left neighboring block, wherein, in the performing of the arithmetic decoding on the first flag, a single context is used to perform the arithmetic decoding on the first flag for the luminance signal, the chrominance Cb signal, and the chrominance Cr signal.

With this, the image decoding apparatus uses a single context in performing arithmetic decoding on the first flag for a luminance signal, a chrominance Cb signal, and a chrominance Cr signal. As a result, the image decoding apparatus is capable of decreasing the number of using contexts in comparison to the case where different contexts are used to perform arithmetic decoding on the first flag for a luminance signal, a chrominance Cb signal, and a chrominance Cr signal. In addition, the image decoding apparatus is capable of reducing a processing amount. Thus, the image decoding method is capable of reducing a processing amount while deterioration of coding efficiency is suppressed.

According to still another exemplary embodiment disclosed herein, an image coding and decoding apparatus includes the above-described image coding apparatus and the above-described image decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments of the image coding apparatus and the image decoding apparatus are described with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Hereinafter, coding sometimes means encoding.

(Embodiment 1)

The following describes an image coding apparatus according to Embodiment 1

<Overall Structure>

FIG. 1 is a block diagram showing the structure of the image coding apparatus 100 according to Embodiment 1.

The image coding apparatus 100 shown in FIG. 1 codes an input image 121 to generate a bitstream 125 (coded bitstream). The image coding apparatus 100 includes a coding block division unit 101, a subtraction unit 102, a transform unit 103, a coefficient variable length coding unit 104, an inverse transform unit 105, an addition unit 106, a frame memory 107, a prediction unit 108, an SAO processing unit 109, and an SAO parameter variable length coding unit 110.

<Processing (Overall)>

Figure 2:
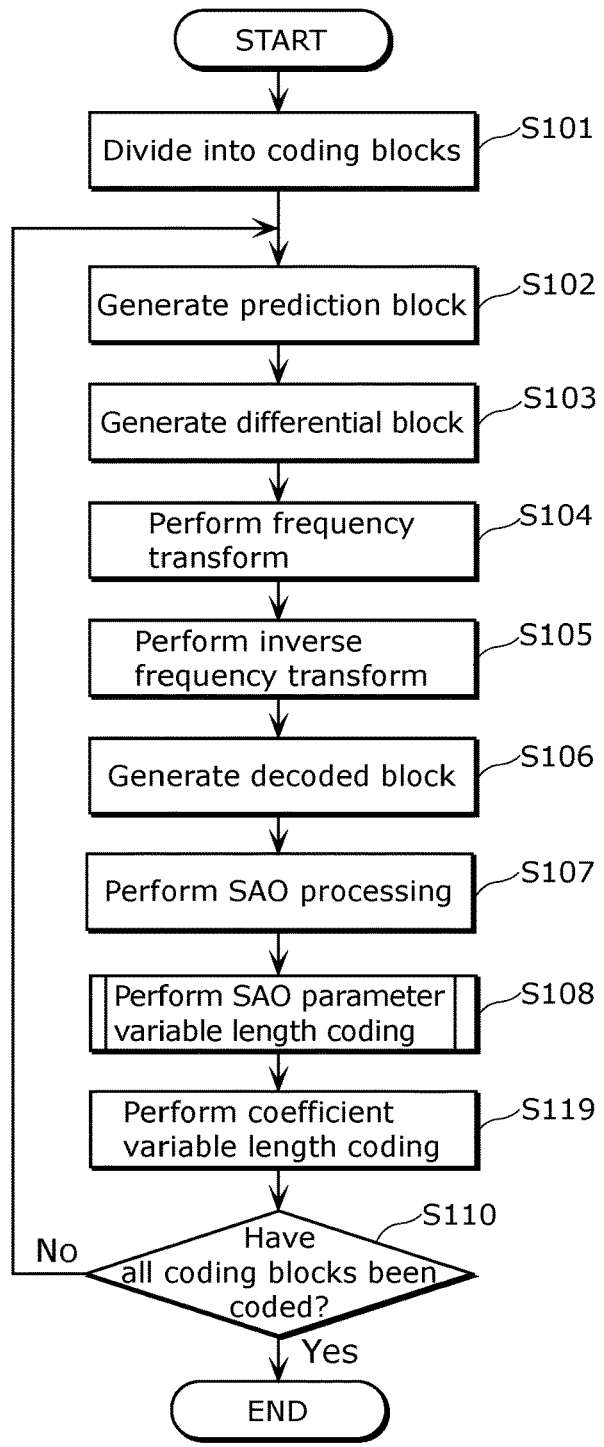
FIG. 2 is a flowchart of image coding according to Embodiment 1.

Next, referring to FIG. 2, an overall flow of the coding is described.

(Step S101)

The coding block division unit 101 divides the input image 121 into blocks to be coded (coding blocks) 122, and sequentially provides the coding blocks 122 to both the subtraction unit 102 and the prediction unit 108. Here, each of the coding blocks 122 has a variable size. The coding block division unit 101 therefore divides the input image 121 into the coding blocks 122 with reference to features of the input image 121. For example, one coding block 122 has horizontal 4 pixels×vertical 4 pixels at minimum, and horizontal 32 pixels×vertical 32 pixels at maximum.

(Step S102)

The prediction unit 108 generates a prediction block 129 from a coding block 122 and a decoded image 128 stored in the frame memory 107.

(Step S103)

The subtraction unit 102 generates a differential block 123 that is a difference between the coding block 122 and the prediction block 129.

(Step S104)

The transform unit 103 transforms the differential block 123 to frequency coefficients 124.

(Step S105)

The inverse transform unit 105 transforms the frequency coefficients 124 to pixel data to reconstruct the differential block 126.

(Step S106)

The addition unit 106 adds the reconstructed differential block 126 and the prediction block 129 together to generate a decoded block 127.

(Step S107)

The SAO processing unit 109 generate an SAO parameter 131 for target pixels in the decoded block 127, and then adds SAO offset values to the pixels according to the generated SAO parameter, thereby generating a decoded block 130. The SAO processing unit 109 stores the resulting decoded block 130 to the frame memory 107.

More specifically, in the offset adding, the SAO processing unit 109 classifies each of the pixels into one of categories, and adds an offset value corresponding to the classified category to the target pixel. There are a plurality of methods for the classification. As an SAO parameter 131, the SAO processing unit 109 generates: sao_type_idx that is a parameter indicating a classification method applied for the target block; and sao_offset indicating offset values. If the SAO parameter 131 for a target block is identical to a SAO parameter 131 for a coded block on the immediately left of the target block, then the SAO processing unit 109 sets sao_merge_left_flag to 1 to indicate this situation.

(Step S108)

The SAO parameter variable length coding unit 110 performs variable length coding on the SAO parameter 131 to generate a bitstream 125. This step will be described later in more detail.

(Step S109)

The coefficient variable length coding unit 104 performs variable length coding on the frequency coefficients 124 to generate a bitstream 125.

(Step S110)

The processing from Step S102 to Step S109 is repeated until all the coding blocks in the target image have been coded.

The following describes the SAO parameter variable length coding unit 110 in more detail.

<Structure of SAO Parameter Variable Length Coding Unit 110>

Figure 3:
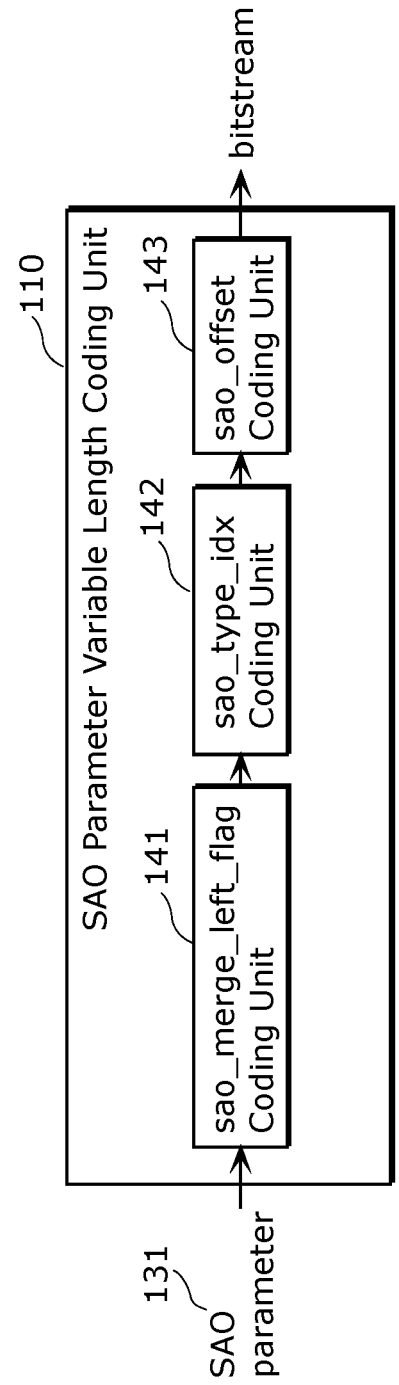
FIG. 3 is a block diagram of an SAO parameter variable length coding unit according to Embodiment 1.

FIG. 3 is a block diagram showing the structure of the SAO parameter variable length coding unit 110. As shown in FIG. 3, the SAO parameter variable length coding unit 110 includes an sao_merge_left_flag coding unit 141, an sao_type_idx coding unit 142, and an sao_offset coding unit 143.

<Processing (Variable Length Coding)>

Figure 4:
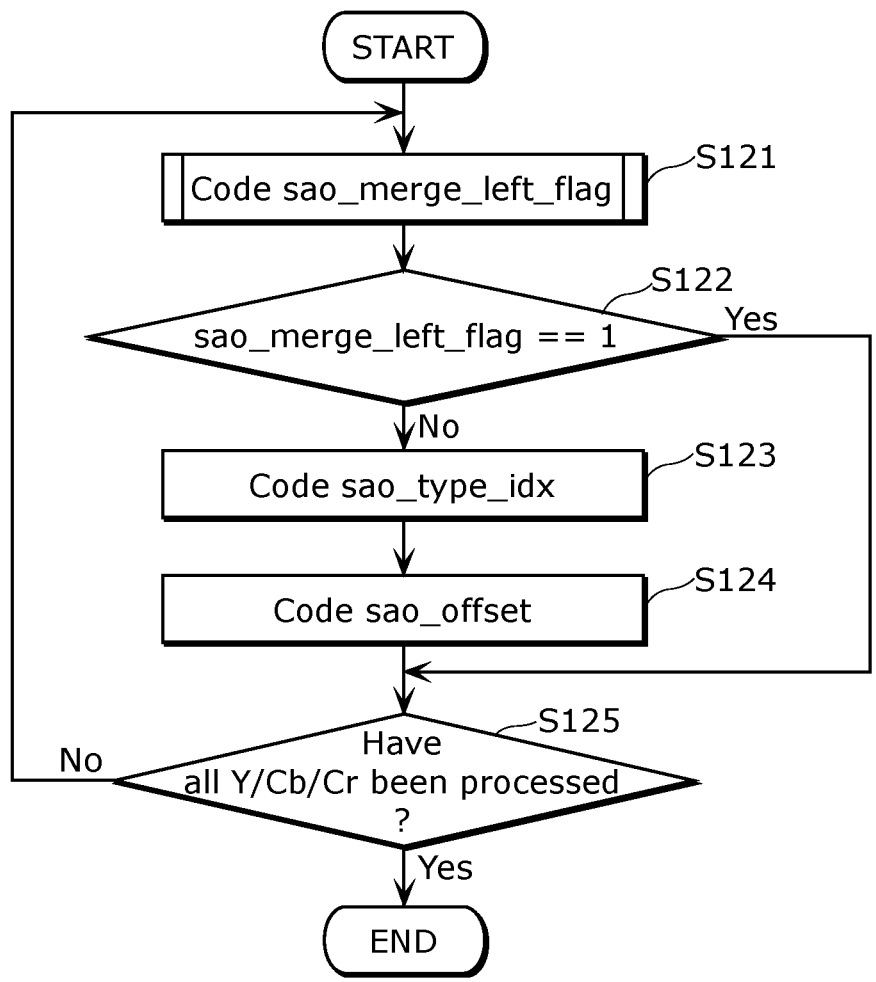
FIG. 4 is a flowchart of SAO parameter variable length coding according to Embodiment 1.

Next, referring to FIG. 4, a flow of the SAO parameter variable length coding (S108 in FIG. 2) is described.

(Step S121)

The sao_merge_left_flag coding unit 141 codes sao_merge_left_flag. It should be noted that the processing from Step S121 to Step S124 is performed for each of a luminance component Y (luminance signal), a chrominance component Cb (chrominance Cb signal), and a chrominance component Cr (chrominance Cr signal). This means that the processing from Step S121 to Step S124 is performed three times. Hereinafter, a luminance component Y, a chrominance component Cb, and a chrominance component Cr are referred to also as Y, Cb, and Cr, respectively.

(Step S122)

The SAO parameter variable length coding unit 110 determines whether or not sao_merge_left_flag is 1. If sao_merge_left_flag is 1, then the SAO parameter variable length coding unit 110 codes neither sao_type_idx nor sao_offset, and proceeds to Step S125. On the other hand, if sao_merge_left_flag is 0, then the SAO parameter variable length coding unit 110 proceeds to Step S123.

(Step S123)

The sao_type_idx coding unit 142 codes sao_type_idx.

(Step S124)

The sao_offset coding unit 143 codes sao_offset.

(Step S125)

The processing from Step S121 to Step S124 is repeated until the respective SAO parameters for Y, Cb, and Cr have been coded.

The following describes the sao_merge_left_flag coding unit 141 in more detail.

<Structure of Sao_Merge_Left_Flag Coding Unit 141>

Figure 5:
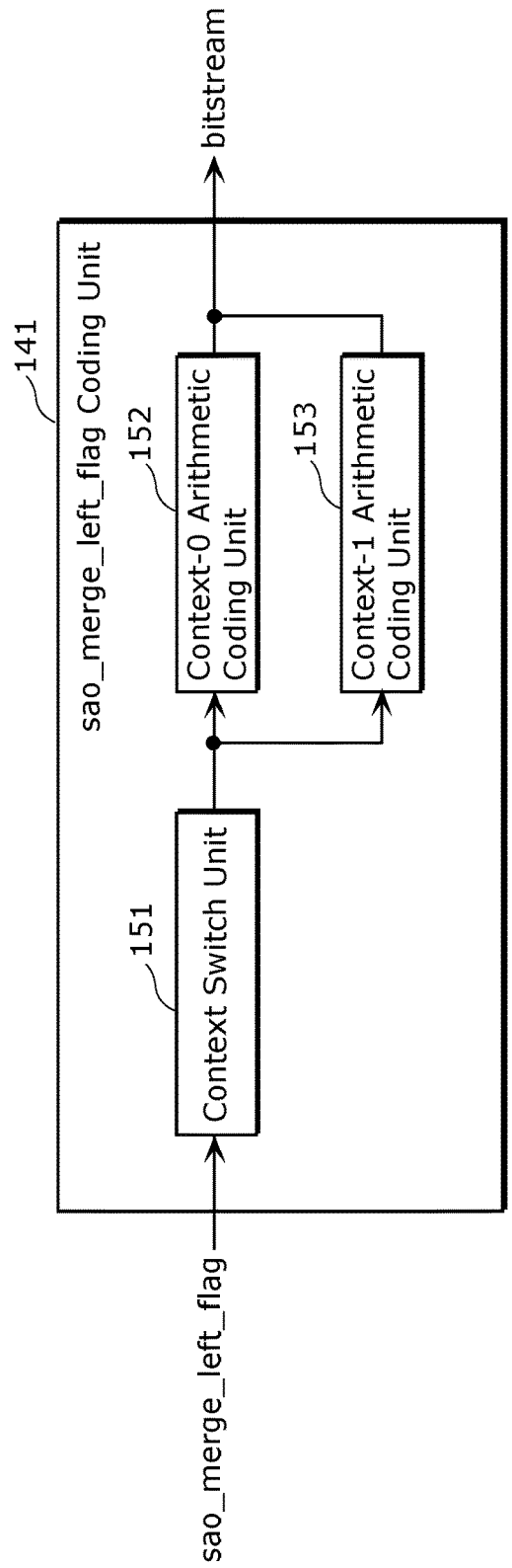
FIG. 5 is a block diagram of an sao_merge_left_flag coding unit according to Embodiment 1.

FIG. 5 is a block diagram showing the structure of the sao_merge_left_flag coding unit 141. As shown in FIG. 5, the sao_merge_left_flag coding unit 141 includes a context switch unit 151, a context-0 arithmetic coding unit 152, and a context-1 arithmetic coding unit 153.

<Processing (Sao_Merge_Left_Flag Coding)>

Figure 6:
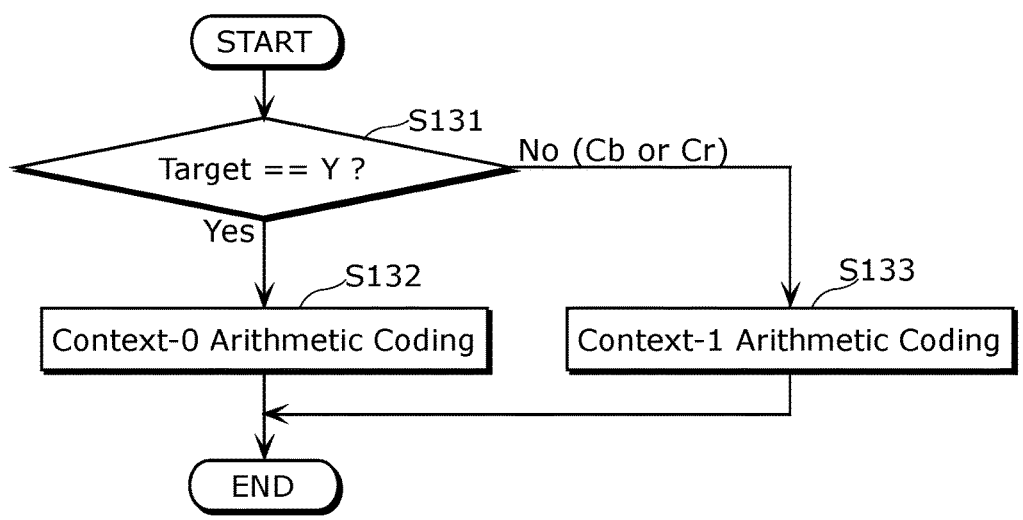
FIG. 6 is a flowchart of sao_merge_left_flag coding according to Embodiment 1.

Next, referring to FIG. 6, the sao_merge_left_flag coding (S121 in FIG. 4) is described in more detail.

(Step S131)

The context switch unit 151 determines whether target sao_merge_left_flag is regarding a luminance component Y. If the target sao_merge_left_flag is regarding a luminance component Y, then the processing proceeds to Step S132. If the target sao_merge_left_flag is regarding Cb or Cr, then the processing proceeds to Step S133.

(Step S132)

The context-0 arithmetic coding unit 152 performs arithmetic coding on sao_merge_left_flag based on a context 0 to generate a bitstream.

(Step S133)

The context-1 arithmetic coding unit 153 performs arithmetic coding on sao_merge_left_flag based on a context 1 to generate a bitstream. In the present embodiment, the sao_merge_left_flag coding unit 141 uses the two kinds of contexts, namely, the context 0 and the context 1, to perform arithmetic coding on sao_merge_left_flag(s). The sao_merge_left_flag coding unit 141 uses the context 0 only for sao_merge_left_flag for the luminance component Y, but uses the context 1 for both sao_merge_left_flag for the chrominance component Cb and sao_merge_left_flag for the chrominance component Cr.

<Effects>

As described above, the image coding apparatus 100 according to the present embodiment uses the same context for sao_merge_left_flag for Cb and sao_merge_left_flag for Cr in arithmetic coding on sao_merge_left_flag(s). The image coding apparatus 100 thereby can decrease the number of contexts and eventually reduce a memory size. In addition, it is possible to eliminate selecting of a context according to a determination as to whether a target is Cb or Cr, and therefore to eliminate the Cb/Cr determination. In the present HEVC standard (Non Patent Literature 1), it is considered that a symbol occurrence probability of sao_merge_left_flag (probability that sao_merge_left_flag is 1) is different between Cb and Cr. Therefore, different contexts are used for Cb and Cr. However, the inventors has conducted the experiments and found that sao_merge_left_flag for Cb and sao_merge_left_flag for Cr correlate with each other, and that sharing the same context between Cb and Cr hardly deteriorates coding efficiency.

Figure 7:
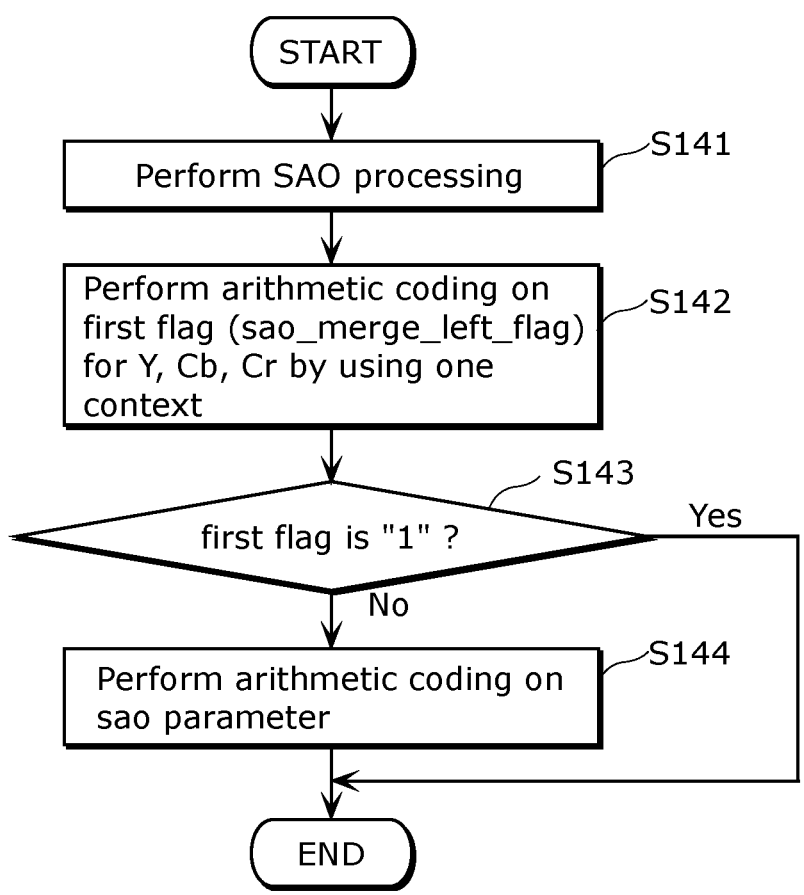
FIG. 7 is a flowchart of an image coding method according to Embodiment 1.

It should be noted that it has been described above that the image coding apparatus 100 uses the same context for Cb and Cr, but it is also possible to use the same context for Y, Cb, and Cr. FIG. 7 is a flowchart of an image coding method performed by the image coding apparatus 100 in the above case.

As shown in FIG. 7, the image coding apparatus 100 performs SAO processing for each of a luminance signal, a chrominance Cb signal, and a chrominance Cr signal included in a target block (S141). More specifically, the image coding apparatus 100 classifies each of pixels included in the target block to one of categories, and adds an offset value corresponding to the classified category to the target pixel. The SAO parameter includes: information (sao_type_idx) indicating a category classification method; and information (sao_offset) indicating the offset values. Examples of the category classification method are a band offset method for classifying pixels according to their values, an edge offset method for classifying pixels according to an edge direction, and the like. sao_type_idx may further indicate whether or not to perform SAO processing.

Next, the image coding apparatus 100 performs arithmetic coding on a first flag (sao_merge_left_flag) indicating whether or not an SAO parameter, which indicates details of SAO processing, of a target block is identical to an SAO parameter for a left neighboring block on the immediately left of the target block (S142). Here, the image coding apparatus 100 uses a single context in arithmetic coding of the first flag for a luminance signal, a chrominance Cb signal, and a chrominance Cr signal. Here, the context is a table indicating a symbol occurrence probability. The context is updated according to a symbol that actually occurs.

If the SAO parameter for the target block is different from the SAO parameter for the left neighboring block, in other words, if the first flag is "0" (No at S143), then the image coding apparatus 100 performs arithmetic coding on the SAO parameter for the target block (S144).

On the other hand, if the SAO parameter for the target block is identical to the SAO parameter of the left neighboring block, in other words, if the first flag is "1" (Yes at S143), then the image coding apparatus 100 does not perform arithmetic coding on the SAO parameter for the target block.

FIG. 8 is a diagram of experiment results of the image coding method according to Embodiment 1 (the technique using the same context for Cb and Cr) and the image coding method according to Variation 1 (the technique using the same context for Y, Cb, and Cr). The experiment conditions are based on common experiment conditions of the HEVC standard group. A larger numerical value represents lower coding efficiency. A negative value represents improvement of the coding efficiency. As seen in FIG. 8, all values are 0.1% or less. It is therefore obvious that coding efficiency is hardly decreased even if the number of contexts is decreased by sharing contexts. In Variation 1, a part of values is −0.3%. As a result, it is seen that coding efficiency is increased. It is considered that sao_merge_left_flag(s) for Y, Cb, and Cr correlate with one another, so that a symbol occurrence probability is converged to an appropriate value at an earlier stage of coding. Furthermore, by using the same context among Y, Cb, and Cr, it is possible to reduce the determination steps for determining whether a target is Y or not, and thereby reduce a processing amount. In addition, the number of contexts can be further decreased.

Moreover, not only sao_merge_left_flag, but also other syntax added to a bitstream may be applied with the method according to the present embodiment or the method according to Variation 1. In other words, the same variable length coding unit may be used for sao_merge_left_flag and other syntax. For example, the image coding apparatus 100 may use sao_merge_up_flag that indicates whether or not an SAO parameter for a block adjacent to a target coding block is to be copied to be used, and use the same context for sao_merge_up_flag for Cb and Cr, or for sao_merge_up_flag for Y, Cb, and Cr. By unifying context selection methods used in arithmetic coding on sao_merge_up_flag and sao_merge_left_flag as described above, it is possible to reduce contexts, and also simplify the apparatus because the apparatus uses the same variable length coding unit for sao_merge_up_flag and sao_merge_left_flag.

In other words, the image coding apparatus 100 performs arithmetic coding on a second flag (sao_merge_up_flag) that indicates whether or not an SAO parameter, which indicates details of SAO processing, of a target block is identical to an SAO parameter for an upper neighboring block that is located immediately above the target block. Furthermore, the image coding apparatus 100 uses the same context determination method to determine: a context to be used for arithmetic coding on the first flag; and a context to be used for arithmetic coding on the second flag. Here, examples of the context determination method are the method of using the same context for Cb and Cr and the method of using the same context for Y, Cb, and Cr, as described above.

It should be noted that it has been described above that the image coding apparatus 100 uses, as an SAO parameter, sao_type_idx indicating a classification type and sao_offset indicating an SAO offset value, but the present embodiment is not limited to the above. For example, an SAO parameter may further include at least one of a parameter serving as supplementary information for classifying pixels, and sao_offset_sign indicating a sign (positive or negative) bit of sao_offset.

It should also been noted that it has been described above that the image coding apparatus 100 codes an SAO parameter for each coding block, but the present embodiment is not limited to the above. The image coding apparatus 100 may code an SAO parameter per unit smaller than a coding block, or per unit consisting of a series of coding blocks. It is further possible that the image coding apparatus 100 does not code an SAO parameter for a target coding block, but copies an SAO parameter for another coding block to be used as the SAO parameter for the target coding block.

It should also be noted that it has been described above that a coding block has a size of 32 pixels×32 pixels at maximum, and 4 pixels×4 pixels at minimum, but a size of a coding block is not limited to the above. Coding blocks may have a fixed size.

It should also be noted that it has been described above that sao_merge_left_flag is generated for each of Y, Cb, and Cr. More specifically, the image coding apparatus 100 uses a single context to perform arithmetic coding on: a luminance first flag that is the first flag for a luminance signal; a Cb first flag that is the first flag for a chrominance Cb signal; and a Cr first flag that is the first flag for a chrominance Cr signal. However, it is also possible that a single sao_merge_left_flag is generated to be shared by Y, Cb, and Cr. Even in the above case, a (single) common context is used for sao_merge_left_flag for Y, Cb, and Cr in the same manner as described in the present embodiment. In other words, the image coding apparatus 100 may use a single context in arithmetic coding on a single first flag shared by a luminance signal, a chrominance Cb signal, and a chrominance Cr signal.

Furthermore, the processing in the present embodiment may be implemented to software. This software may be distributed by downloading or the like. Or, this software may be recorded onto a recording medium such as a CD-ROM to be distributed. The above is applied to the other embodiments in this description.

(Embodiment 2)

In Embodiment 2, the description is given for an image decoding apparatus 200 that decodes a coded bitstream generated by the image coding apparatus 100 according to Embodiment 1.

<Overall Structure>

Figure 9:
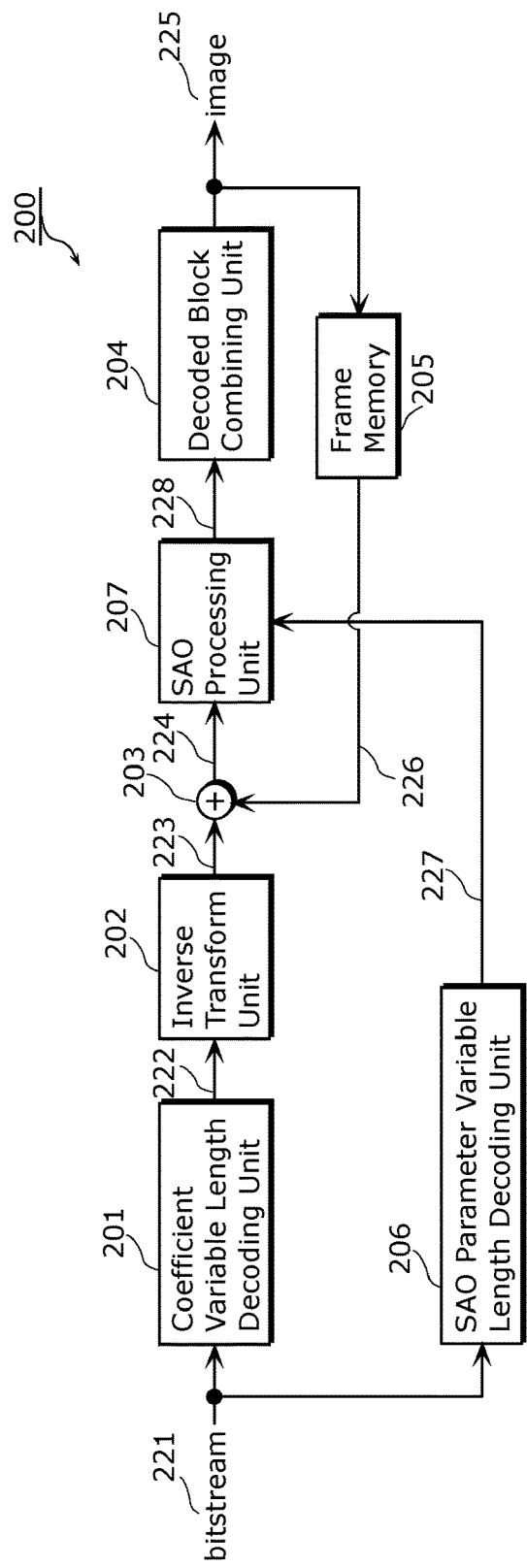
FIG. 9 is a block diagram of an image decoding apparatus according to Embodiment 2.

FIG. 9 is a block diagram showing the structure of the image decoding apparatus 200 according to Embodiment 2.

The image decoding apparatus 200 shown in FIG. 9 decodes a bitstream 221 to generate a decoded image 225. Here, the bitstream 221 corresponds, for example, to the bitstream 125 generated by the above-described image coding apparatus 100. The image decoding apparatus 200 includes a coefficient variable length decoding unit 201, an inverse transform unit 202, an addition unit 203, a decoded block combining unit 204, a frame memory 205, an SAO parameter variable length decoding unit 206, and an SAO processing unit 207.

<Processing (Overall)>

Figure 10:
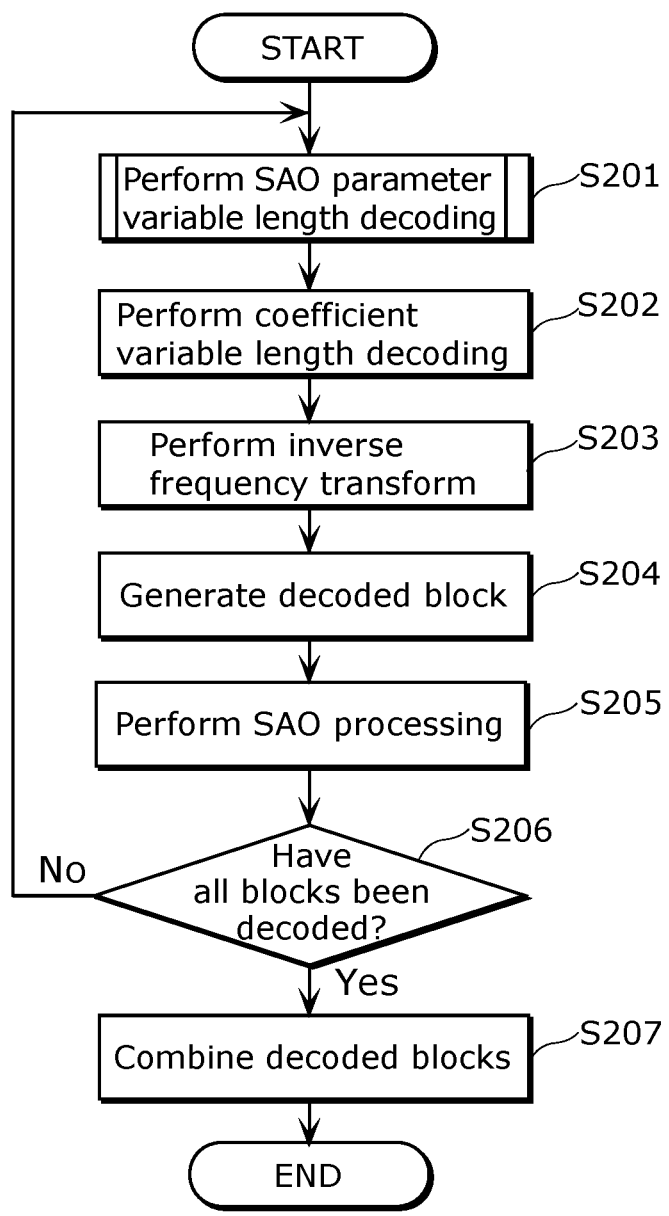
FIG. 10 is a flowchart of image decoding according to Embodiment 2.

Next, referring to FIG. 10, an overall flow of the decoding is described.

(Step S201)

The SAO parameter variable length decoding unit 206 performs variable length decoding on the bitstream 221 to obtain the SAO parameter 227.

(Step S202)

The coefficient variable length decoding unit 201 performs variable length decoding on the bitstream 221 to obtain frequency coefficients 222. The coefficient variable length decoding unit 201 provides the frequency coefficients 222 to the inverse transform unit 202.

(Step S203)

The inverse transform unit 202 transforms the frequency coefficients 222 to pixel data to generate the differential block 223.

(Step S204)

The addition unit 203 adds a decoded image 226 stored in the frame memory 205 to the differential block 223, thereby generating a decoded block 224.

(Step S205)

The SAO processing unit 207 classifies each of pixels in the decoded block 224 into one of categories according to the SAO parameter 227, and adds an offset value corresponding to the category to the target pixel. As a result, a decoded block 228 is generated.

(Step S206)

The processing from Step S201 to Step S205 is repeated until all blocks in a target image have been decoded.

(Step S207)

The decoded block combining unit 204 combines a plurality of the decoded blocks 228 together to generate a decoded image 225, and stores the decoded image 225 to the frame memory 205 as a decoded image 226.

The following describes the SAO parameter variable length decoding unit 206 in more detail.

<Structure of SAO Parameter Variable Length Decoding Unit 206>

Figure 11:
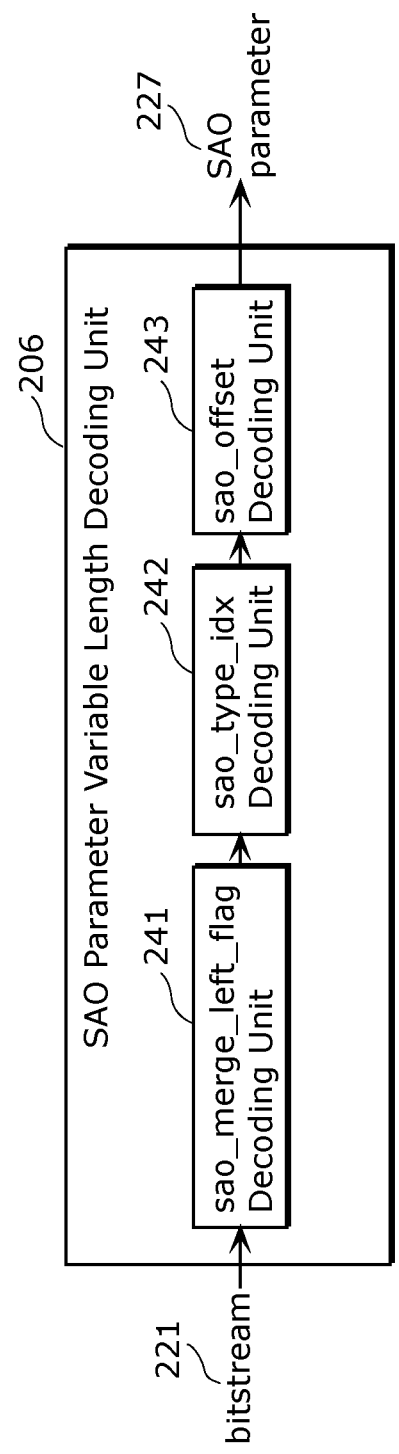
FIG. 11 is a block diagram of an SAO parameter variable length decoding unit according to Embodiment 2.

FIG. 11 is a block diagram showing the structure of the SAO parameter variable length decoding unit 206. As seen in FIG. 11, the SAO parameter variable length decoding unit 206 includes an sao_merge_left_flag decoding unit 241, an sao_type_idx decoding unit 242, and an sao_offset decoding unit 243.

<Processing (SAO Parameter Variable Length Decoding)>

Figure 12:
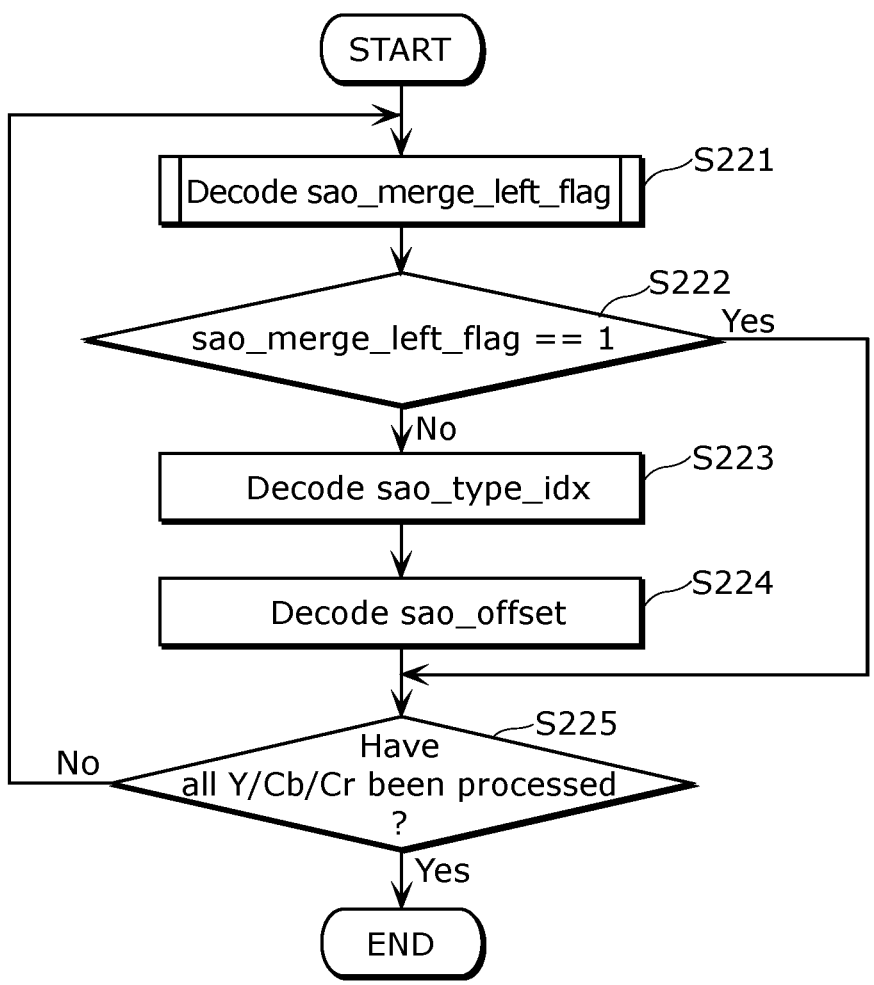
FIG. 12 is a flowchart of SAO parameter variable length decoding according to Embodiment 2.

FIG. 12 is a flowchart of the SAO parameter variable length decoding (S201 in FIG. 10). The SAO parameter variable length decoding shown in FIG. 12 differs from the SAO parameter variable length coding shown in FIG. 4 according to Embodiment 1 merely in that coding is replaced by decoding. If sao_merge_left_flag is 1, the SAO parameter variable length decoding unit 206 decodes neither sao_type_idx nor sao_offset, but copies an SAO parameter for a decoded block on the immediately left of the target block and use it in SAO processing.

(Step S221)

The sao_merge_left_flag decoding unit 241 decodes sao_merge_left_flag. It should be noted that the processing from Step S221 to Step S224 is performed for each of a luminance component Y, a chrominance component Cb, and a chrominance component Cr. This means that the processing from Step S221 to Step S224 is performed three times.

(Step S222)

The SAO parameter variable length decoding unit 206 determines whether or not sao_merge_left_flag is 1. If sao_merge_left_flag is 1, then the SAO parameter variable length decoding unit 216 decodes neither sao_type_idx nor sao_offset, and proceeds to Step S225. On the other hand, if sao_merge_left_flag is 0, then the SAO parameter variable length decoding unit 206 proceeds to Step S223.

(Step S223)

The sao_type_idx decoding unit 242 decodes sao_type_idx.

(Step S224)

The sao_offset decoding unit 243 decodes sao_offset.

(Step S225)

The processing from Step S221 to Step S224 is repeated until SAO parameters for Y, Cb, and Cr have been decoded.

The following describes the sao_merge_left_flag decoding unit 241 in more detail.

<Structure of Sao_Merge_Left_Flag Decoding Unit 241>

Figure 13:
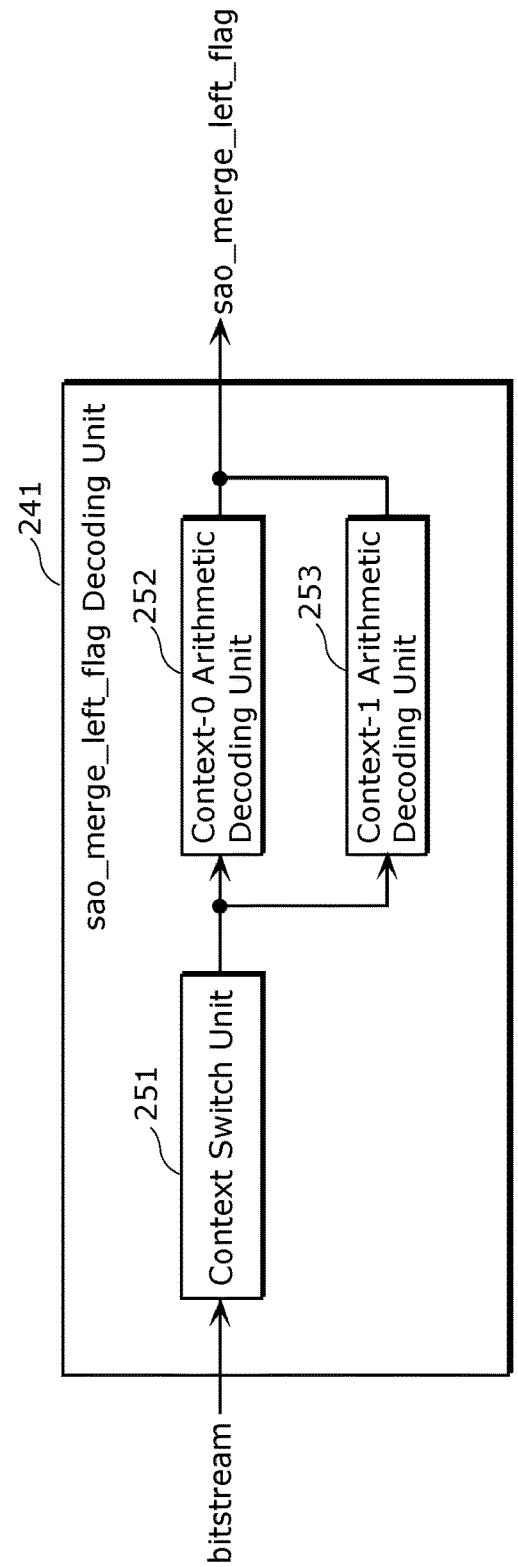
FIG. 13 is a block diagram of an sao_merge_left_flag decoding unit according to Embodiment 2.

FIG. 13 is a block diagram showing the structure of the sao_merge_left_flag decoding unit 241. As shown in FIG. 13, the sao_merge_left_flag decoding unit 241 includes a context switch unit 251, a context-0 arithmetic decoding unit 252, and a context-1 arithmetic decoding unit 253.

<Processing (Sao_Merge_Left_Flag Decoding)>

Figure 14:
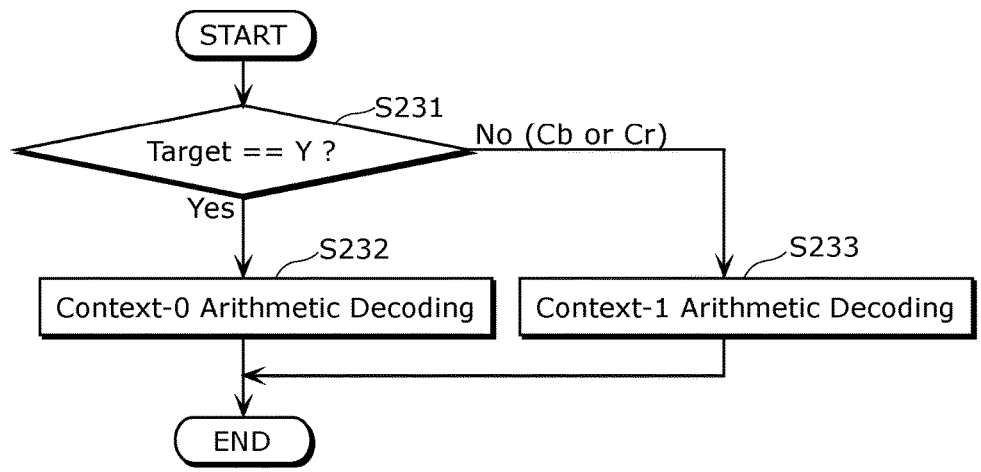
FIG. 14 is a flowchart of sao_merge_left_flag decoding according to Embodiment 2.

FIG. 14 is a flowchart of the sao_merge_left_flag decoding (S221 in FIG. 12). The sao_merge_left_flag decoding shown in FIG. 14 differs from the sao_merge_left_flag coding shown in FIG. 6 according to Embodiment 1 merely in that coding is replaced by decoding.

(Step S231)

The context switch unit 251 determines whether target sao_merge_left_flag is regarding a luminance component Y. If the target sao_merge_left_flag is regarding a luminance component Y, then the processing proceeds to Step S232. If the target sao_merge_left_flag is regarding Cb or Cr, then the processing proceeds to Step S233.

(Step S232)

The context-0 arithmetic decoding unit 252 performs arithmetic decoding on sao_merge_left_flag based on a context 0 to generate a bitstream.

(Step S233)

The context-1 arithmetic decoding unit 253 performs arithmetic decoding on sao_merge_left_flag based on a context 1 to generate a bitstream. In the present embodiment, the sao_merge_left_flag decoding unit 241 uses the two kinds of contexts, namely, the context 0 and the context 1, to perform arithmetic decoding on sao_merge_left_flag(s). The sao_merge_left_flag decoding unit 241 uses the context 0 only for sao_merge_left_flag for the luminance component Y, but uses the context 1 for both sao_merge_left_flag for the chrominance component Cb and sao_merge_left_flag for the chrominance component Cr.

<Effects>

With the structure as described above, the image decoding apparatus 200 according to the present embodiment can offer the same effects as those offered by Embodiment 1 described above.

It should be noted that the image decoding apparatus 200 according to the present embodiment may be modified to a variation similar to that of Embodiment 1 described above.

Figure 15:
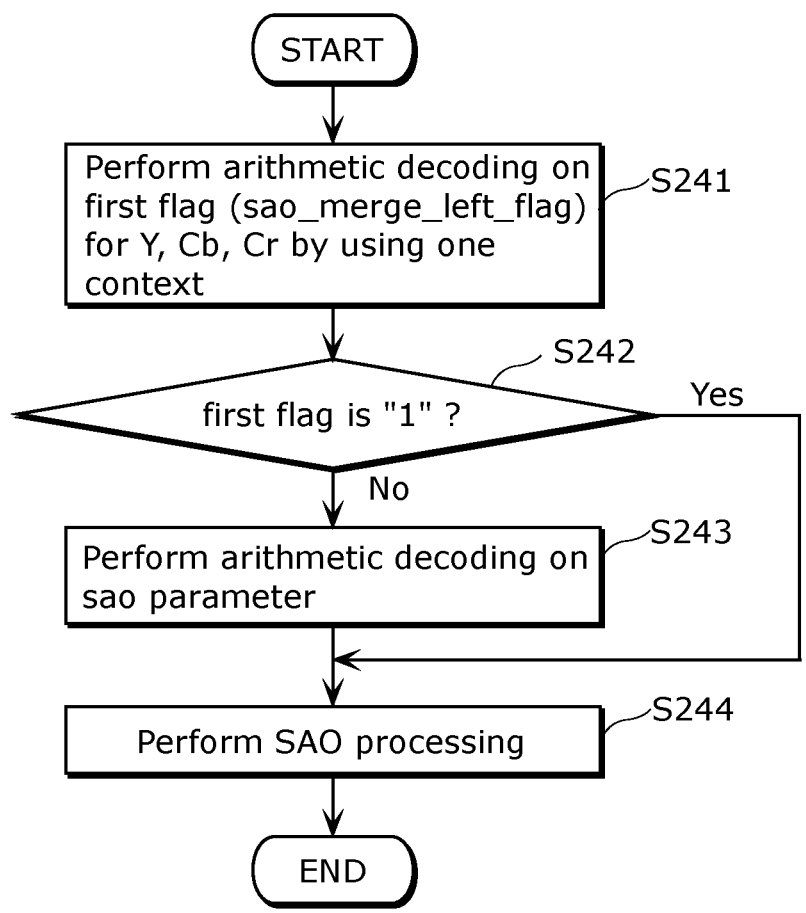
FIG. 15 is a flowchart of an image decoding method according to Embodiment 2.

For example, although it has been described above that the image decoding apparatus 200 uses the same context for Cb and Cr, it is also possible to use the same context for Y, Cb, and Cr. FIG. 15 is a flowchart of an image decoding method performed by the image decoding apparatus 200 in this case.

As shown in FIG. 15, the image decoding apparatus 200 performs arithmetic decoding on a first flag (sao_merge_left_flag) indicating whether or not an SAO parameter, which indicates details of SAO processing, of the target block is identical to an SAO parameter for a left neighboring block on the immediately left of the target block (S241). Here, the image decoding apparatus 200 uses a single context in arithmetic decoding on the first flag for a luminance signal, a chrominance Cb signal, and a chrominance Cr signal.

If the first flag indicates that the SAO parameter for the target block is different from the SAO parameter for the left neighboring block, in other words, if the first flag is "0" (No at S242), then the image decoding apparatus 200 performs arithmetic decoding on the SAO parameter for the target block (S243).

Next, according to the first flag, the image decoding apparatus 200 performs SAO processing on each of a luminance signal, a chrominance Cb signal, and a chrominance Cr signal which are included in the target block, by using one of: the SAO parameter for the target block that has been applied with the arithmetic decoding; and the SAO parameter for the left neighboring block (S244). More specifically, when the first flag is "0", the image decoding apparatus 200 uses the SAO parameter for the target block that has been obtained by the arithmetic decoding, and when the second flag is "1", the image decoding apparatus 200 uses the SAO parameter for the left neighboring block. The SAO parameter includes: information (sao_type_idx) indicating a category classification method; and information (sao_offset) indicating the offset values. The image decoding apparatus 200 classifies each of pixels in the target block to one of categories, by the category classification method indicated by sao_type_idx. Then, the image decoding apparatus 200 adds each of the pixels with an offset value corresponding to the classified category. The offset value is indicated by sao_offset.

It should be noted that, in the same manner as described in Embodiment 1, the image decoding apparatus 200 may perform arithmetic decoding on a second flag (sao_merge_up_flag) that indicates whether or not an SAO parameter, which indicates details of SAO processing, of a target block is identical to an SAO parameter for an upper neighboring block that is located immediately above the target block. In this case, the image decoding apparatus 200 may use the same context determination method to determine: a context to be used for arithmetic decoding on the first flag; and a context to be used for arithmetic decoding on the second flag.

It should also be noted that the image decoding apparatus 200 may use a single context to perform arithmetic decoding on: a luminance first flag that is the first flag for a luminance signal; a Cb first flag that is the first flag for a chrominance Cb signal; and a Cr first flag that is the first flag for a chrominance Cr signal.

It should also be noted that the image decoding apparatus 200 may use a single context in arithmetic decoding on a single first flag shared by a luminance signal, a chrominance Cb signal, and a chrominance Cr signal.

In each of the above-described embodiments, each of the functional blocks can be generally implemented to a Micro Processing Unit (MPU), a memory, or the like. Furthermore, the processing performed by each of the functional blocks can be generally implemented to software (program), and the software is recorded on a recording medium such as a Read-Only Memory (ROM). Then, such software may be distributed by down-loading, for example, or may be recoded on a recording medium such as a Compact Disc Read Only Memory (CD-ROM) to be distributed. Furthermore, each of the functional blocks may be, of course, implemented to hardware (dedicated circuit).

The processing described in each of the embodiments may be performed as centralized processing by using a single device (system), or as decentralized processing by using a plurality of devices. Furthermore, the above-described program may be executed by a single computer or by a plurality of computers. In other words, both centralized processing and decentralized processing may be performed on the computer.

Although the image coding apparatus and the image decoding apparatus have been described with reference to the plurality of embodiments as above, the present disclosure is not limited to these embodiments.

It should also be noted that processing units in each of the image coding apparatus and the image decoding apparatus according to the above embodiments are typically implemented into a Large Scale Integration (LSI) which is an integrated circuit. These may be integrated separately, or a part or all of them may be integrated into a single chip.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Each of the structural elements in each of the above-described embodiments may be configured in the form of a dedicated hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

In other words, each of the image coding apparatus and the image decoding apparatus includes: control circuitry; and storage electrically connected to the control circuitry and accessible from the control circuitry. The control circuitry includes at least one of the dedicated hardware and the program execution unit. The storage holds the software program executed by the program execution unit, when the control circuitry includes the program execution unit.

Furthermore, the prevent disclosure may be the above-described software program, or may be a non-transitory computer-readable recording medium on which the program is recorded. Of course, the program may be distributed via a transmission medium such as the Internet.

Furthermore, all the numerals in the above description are examples for explaining the present disclosure in more detail. The present discloser is not limited to the example numerals.

Moreover, the dividing of the functional blocks in the block diagrams is one example. It is also possible that a plurality of functional blocks are implemented as one functional block, that one functional block is divided into a plurality of pieces, or that a partial function is shifted to a different functional block. In addition, the functions of the plurality of functional blocks having similar functions may be performed in parallel or in time sharing by a common single hardware or software.

It should also be noted that the order of executing the steps included in each of the above-described image coding method and the above-described image decoding method is the example of explaining the present disclosure in more detail. Therefore, different orders except the above-described order may be used. A part of the steps may be executed at the same time (in parallel) with a different step.

Thus, although only some exemplary embodiments have been described in detail above, the present disclosure is not limited to these embodiments. Those skilled in the art will be readily appreciated that various modifications of the exemplary embodiments and desired combinations of the structural elements of the embodiments are possible without materially departing from the novel teachings and advantages of the subject-matters of the appended claims. Accordingly, all such modifications and combinations are intended to be included within the scope of the present disclosure.

(Embodiment 3)

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 16:
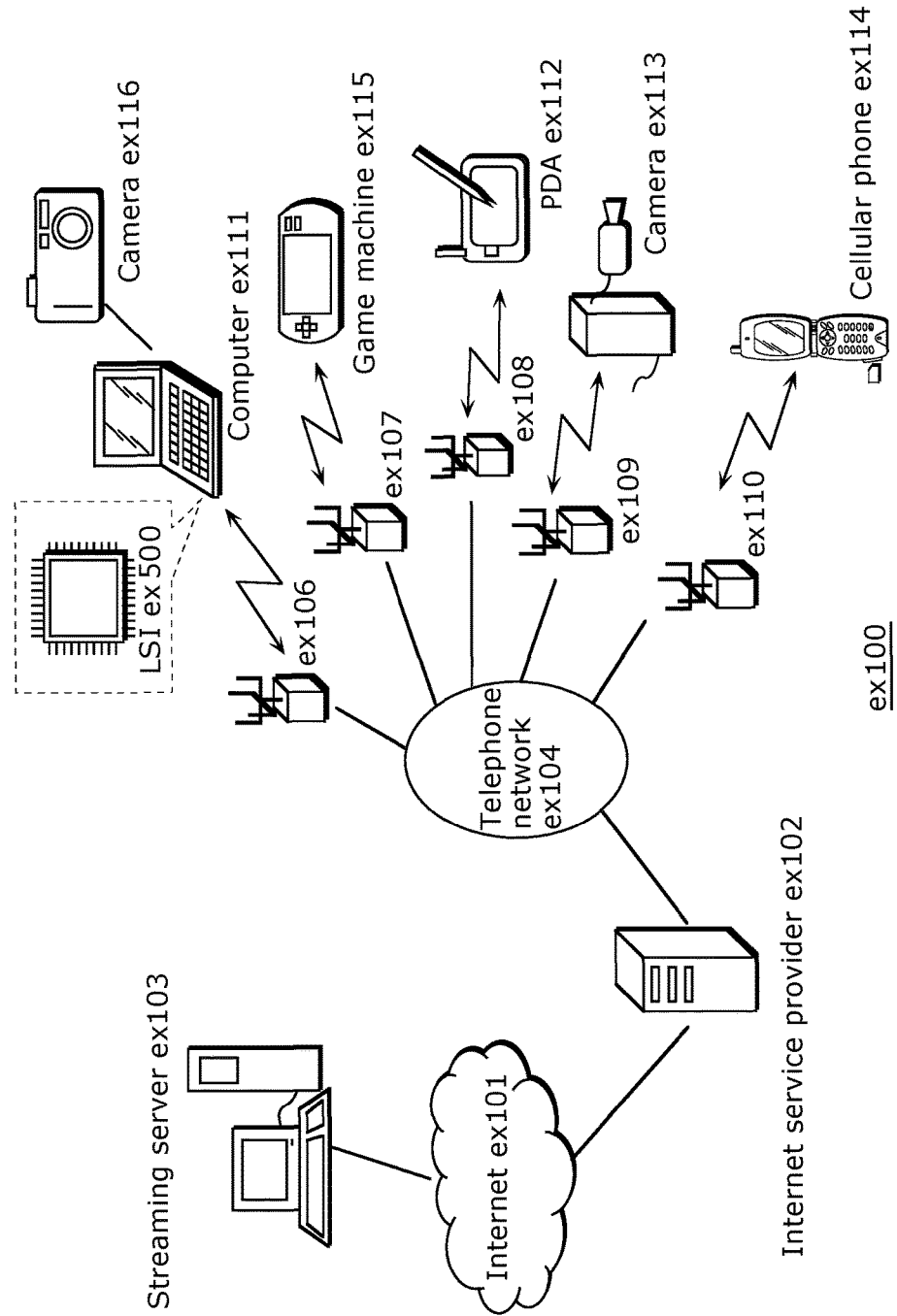
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
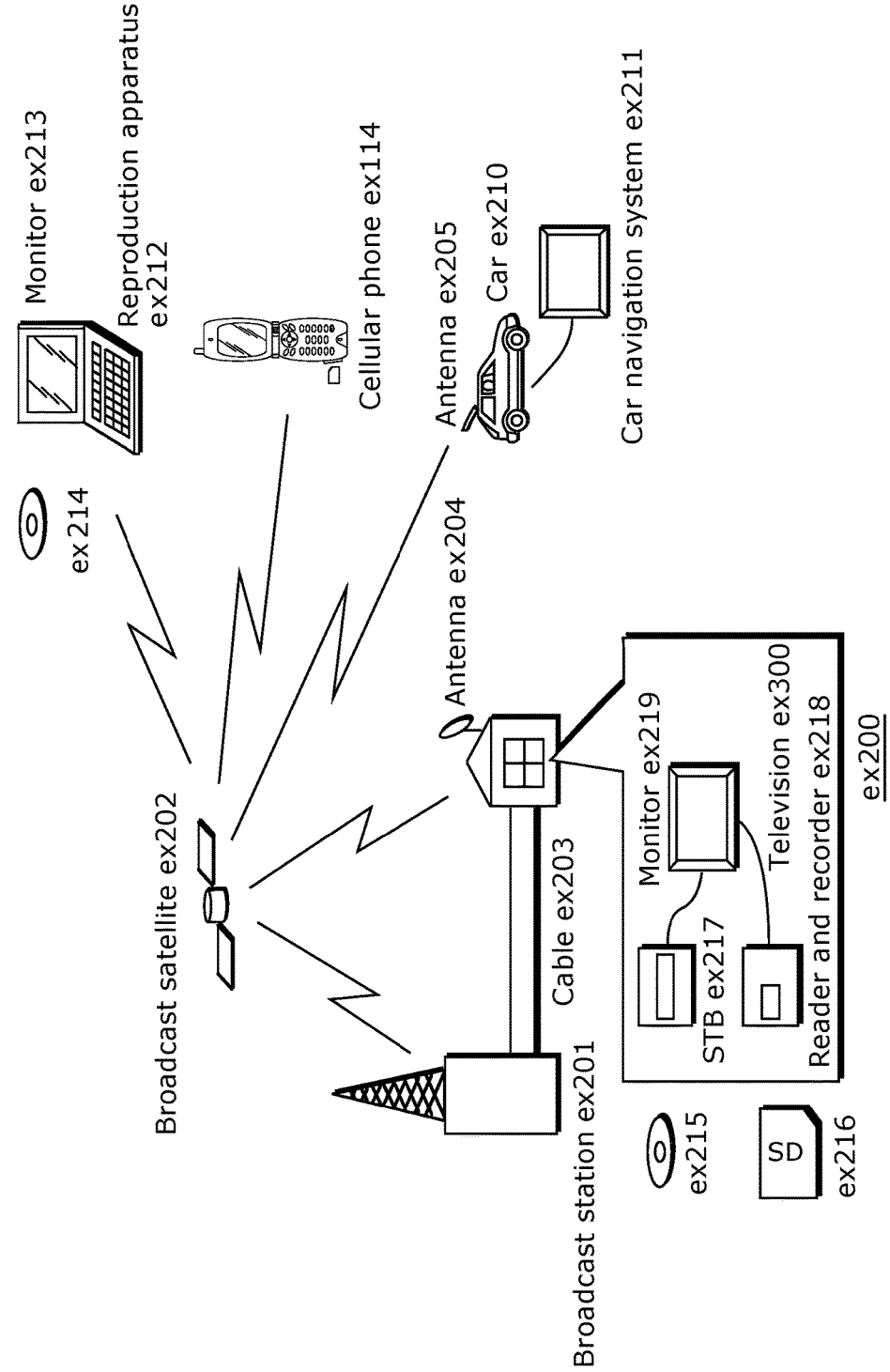
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (*i*) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
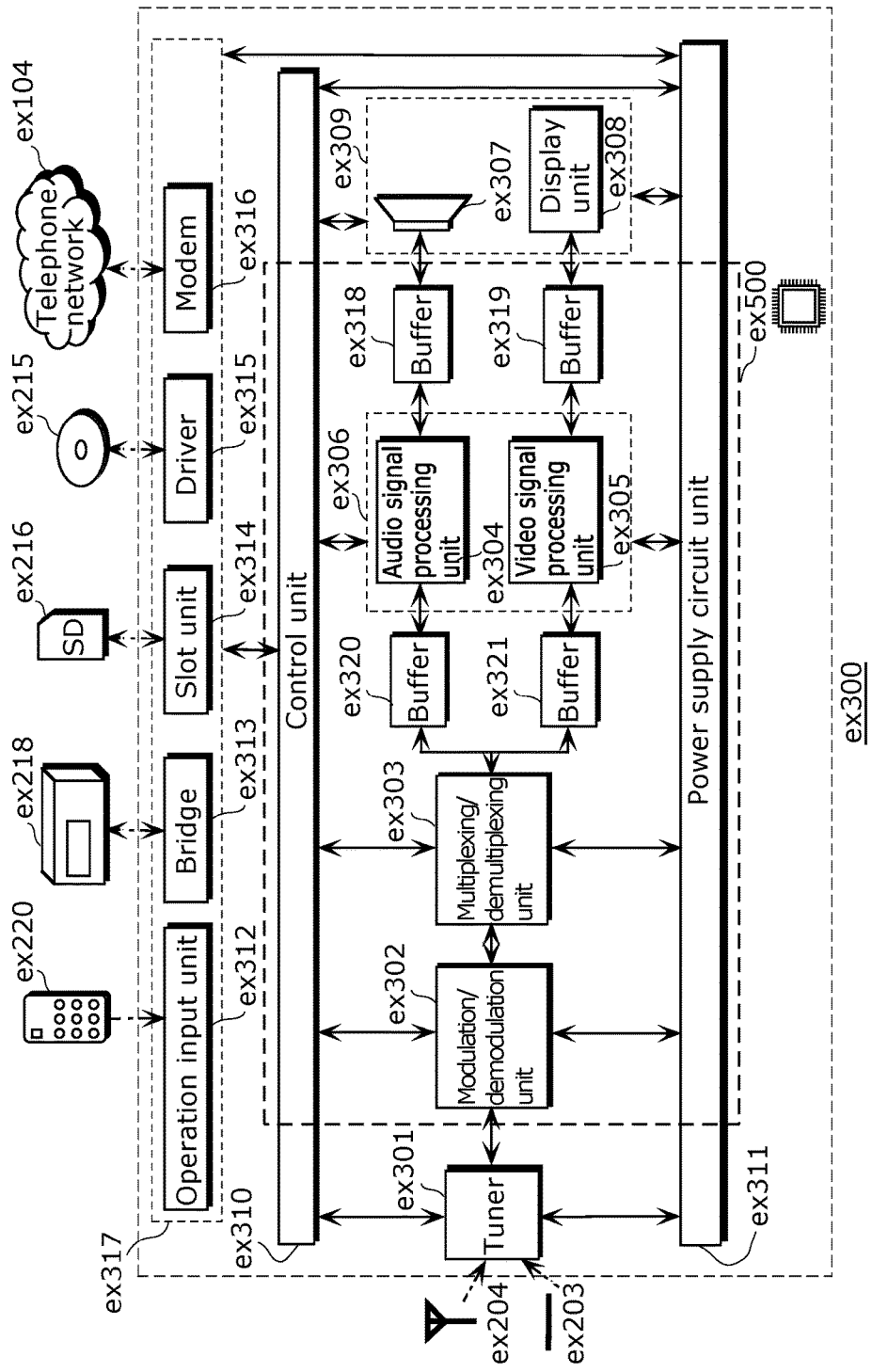
FIG. 18 shows a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
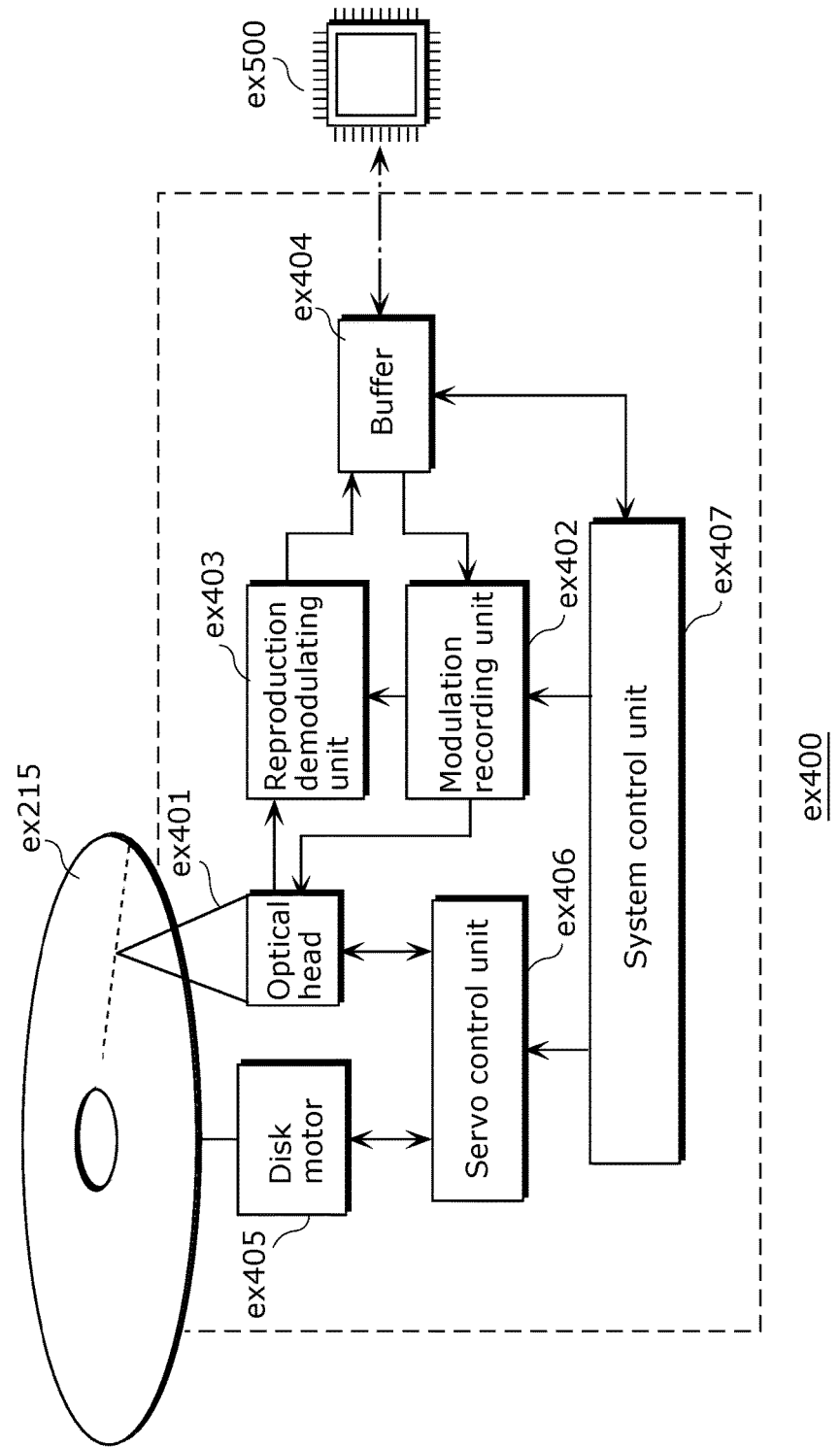
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
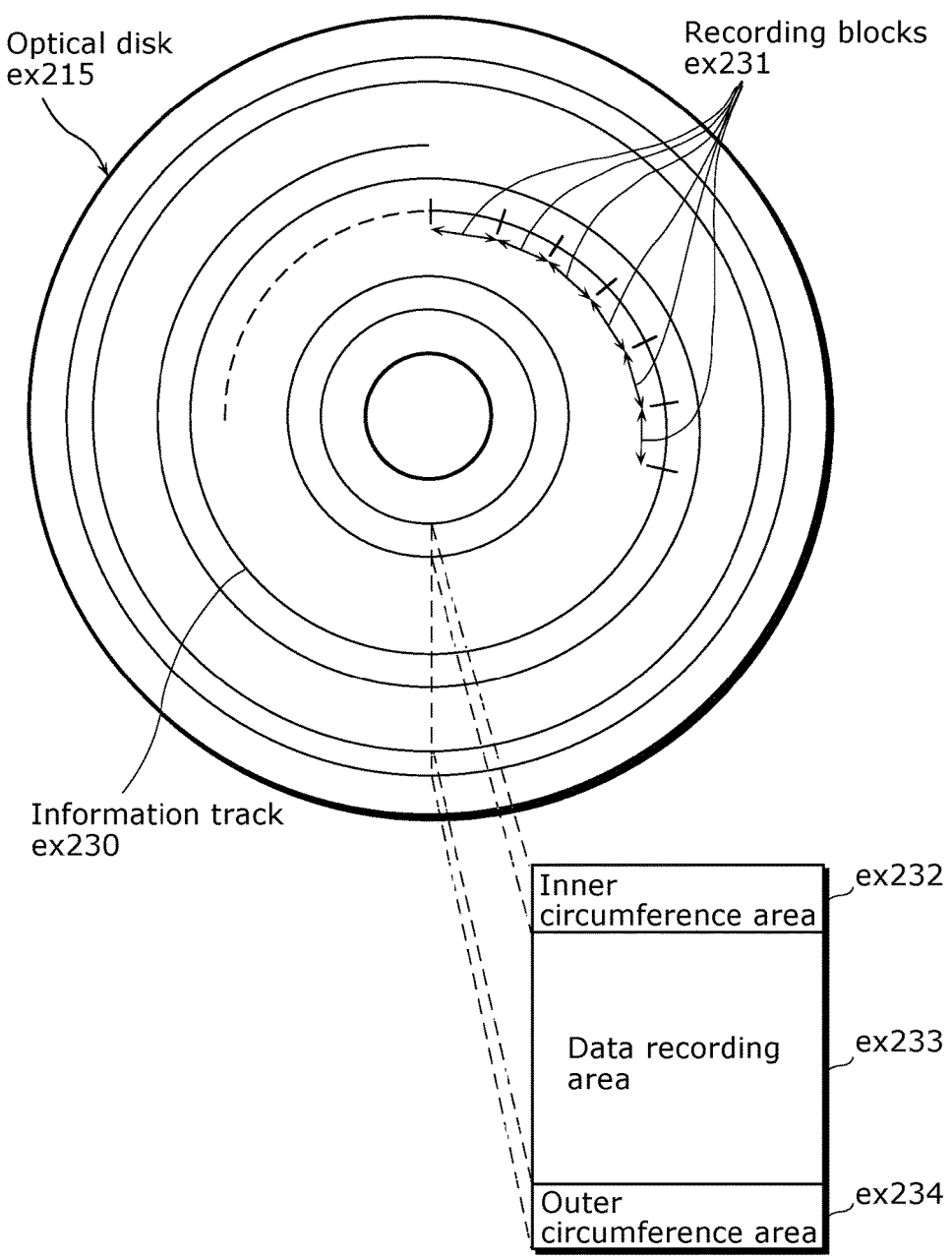
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
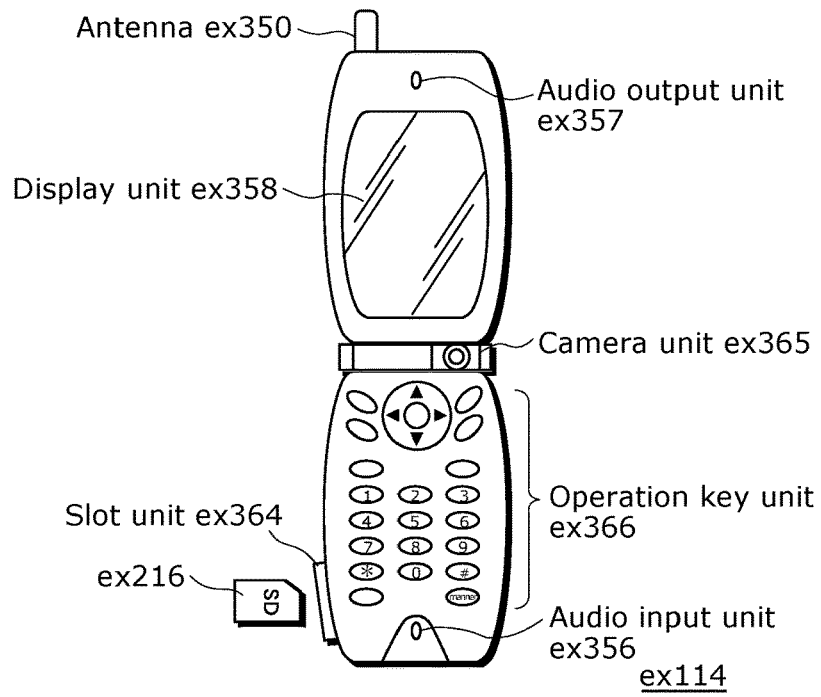
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
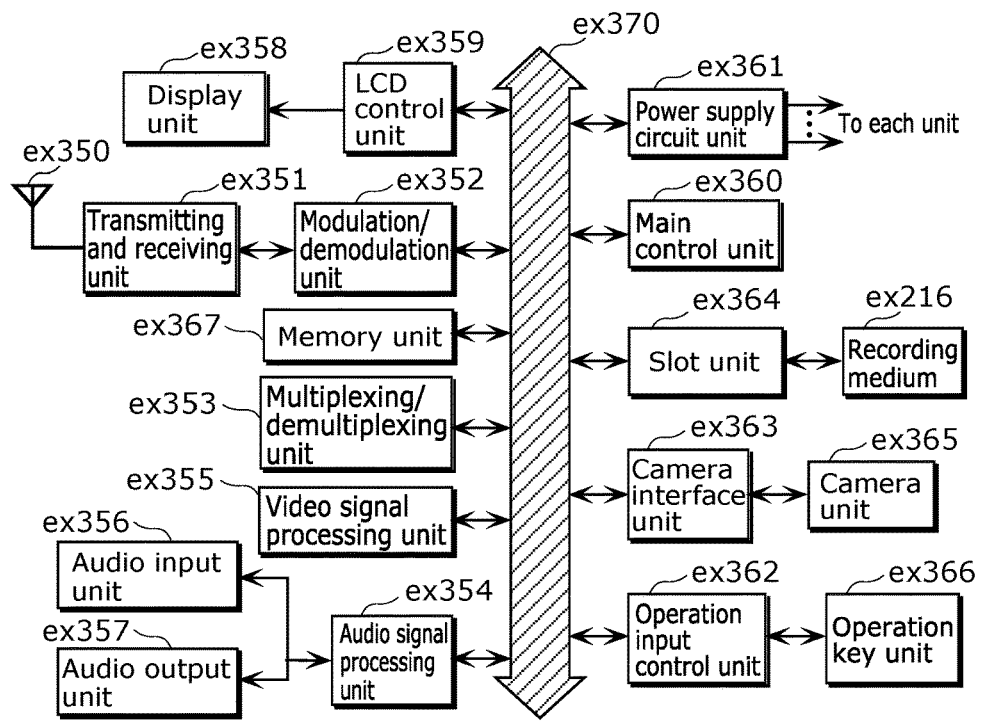
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

(Embodiment 4)

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
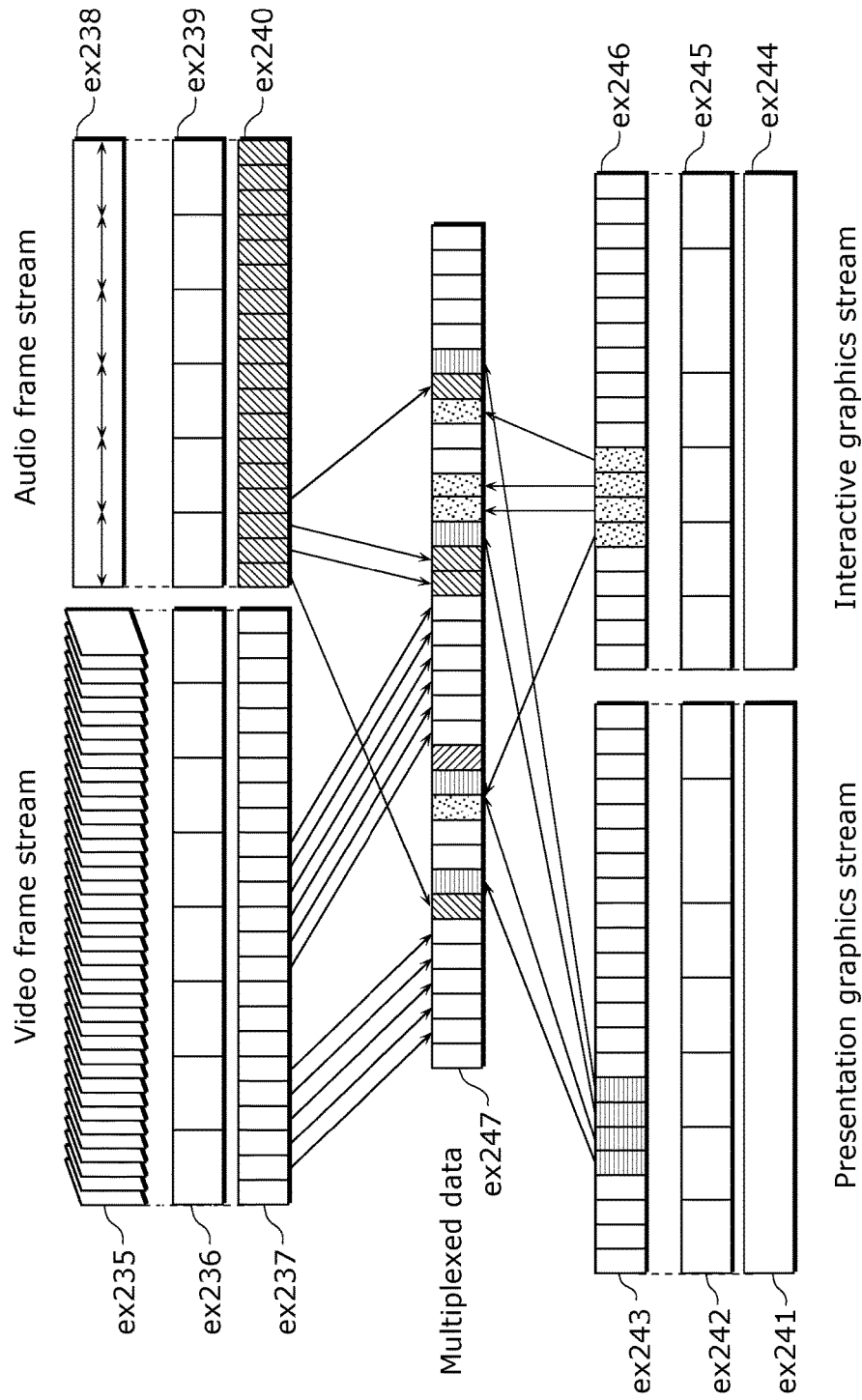
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
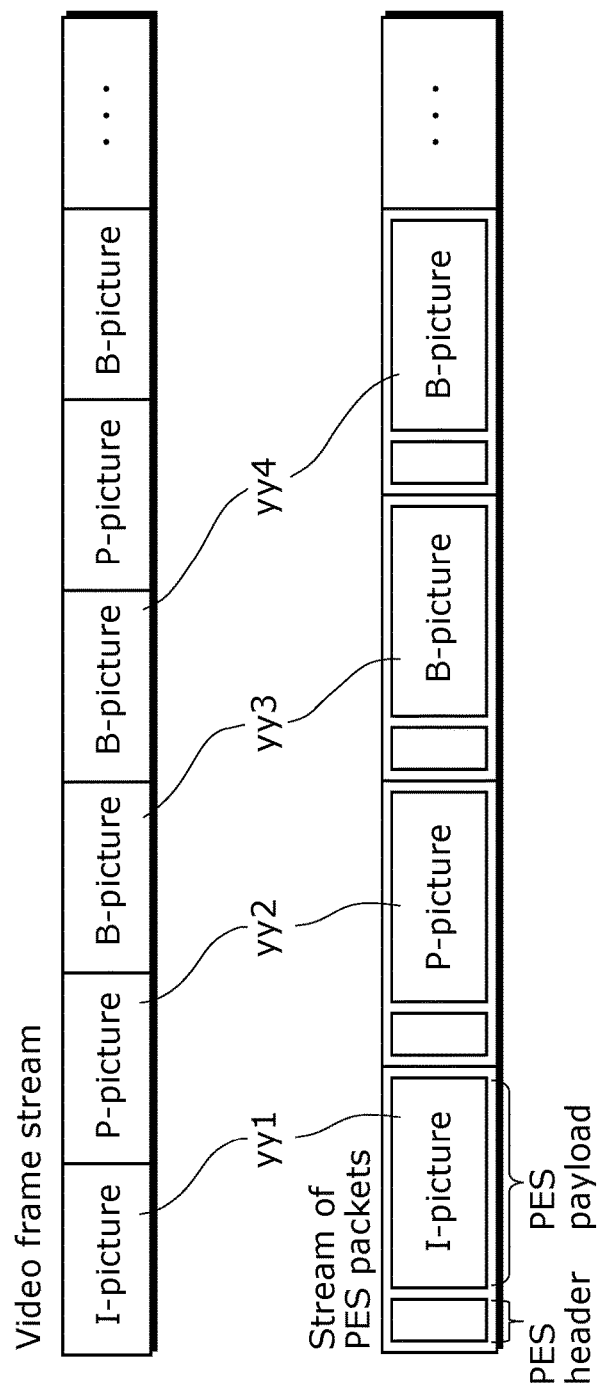
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
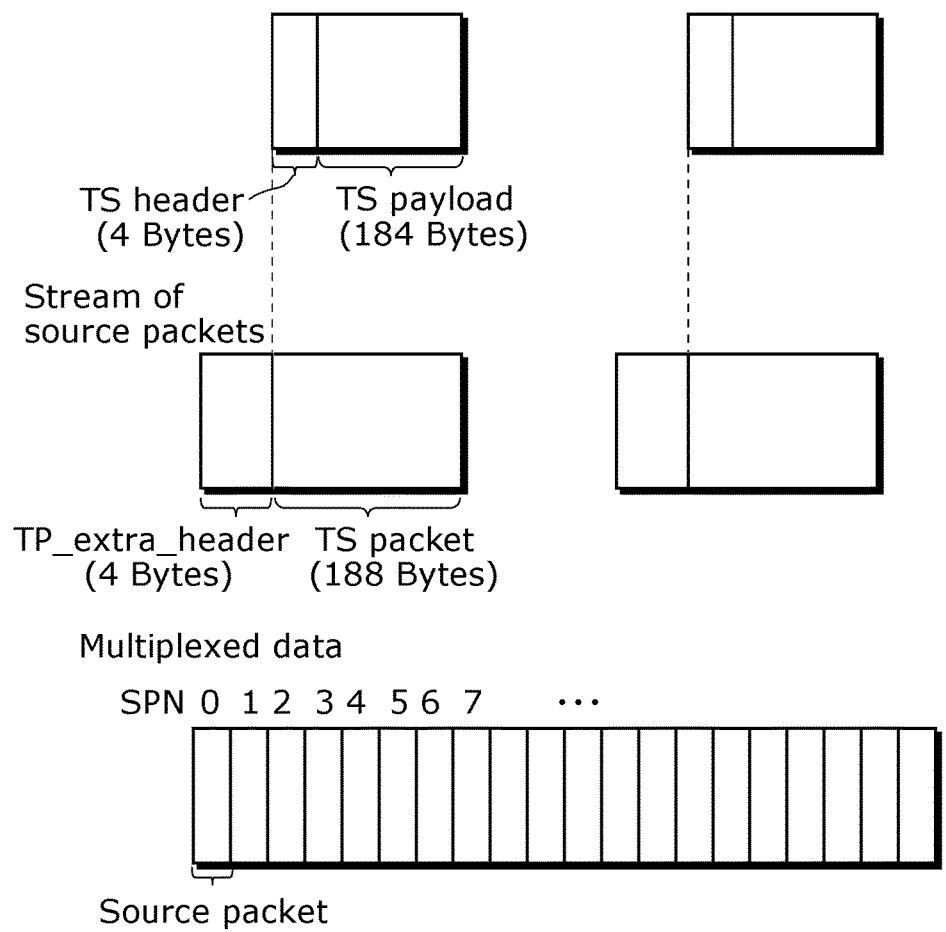
FIG. 25 shows a structure of TS packets and source packets in the multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
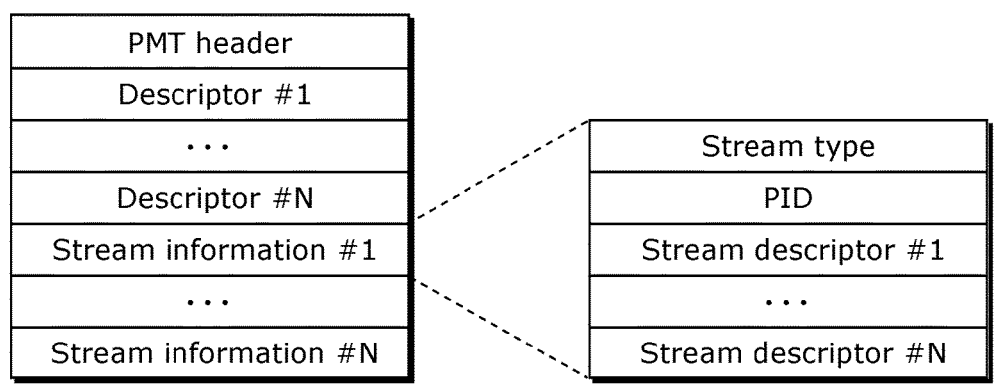
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
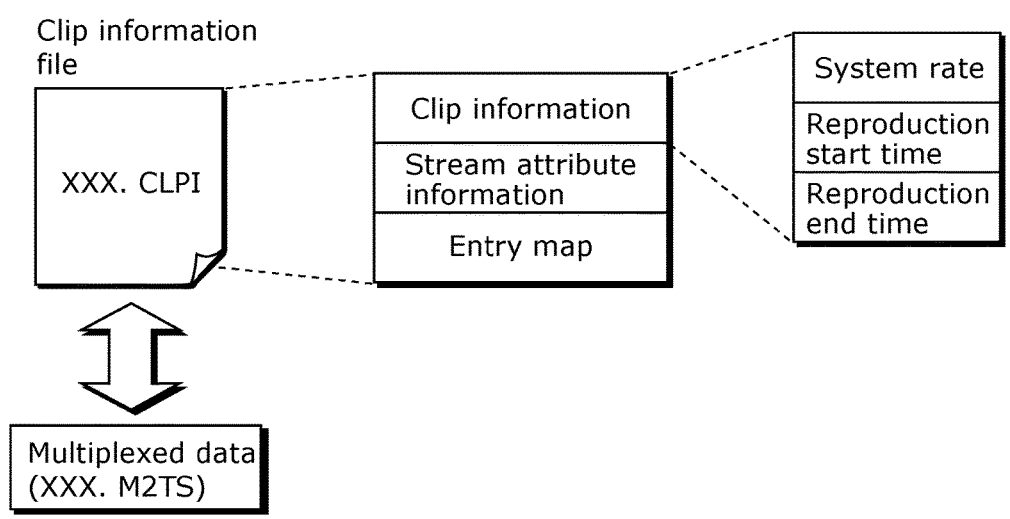
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
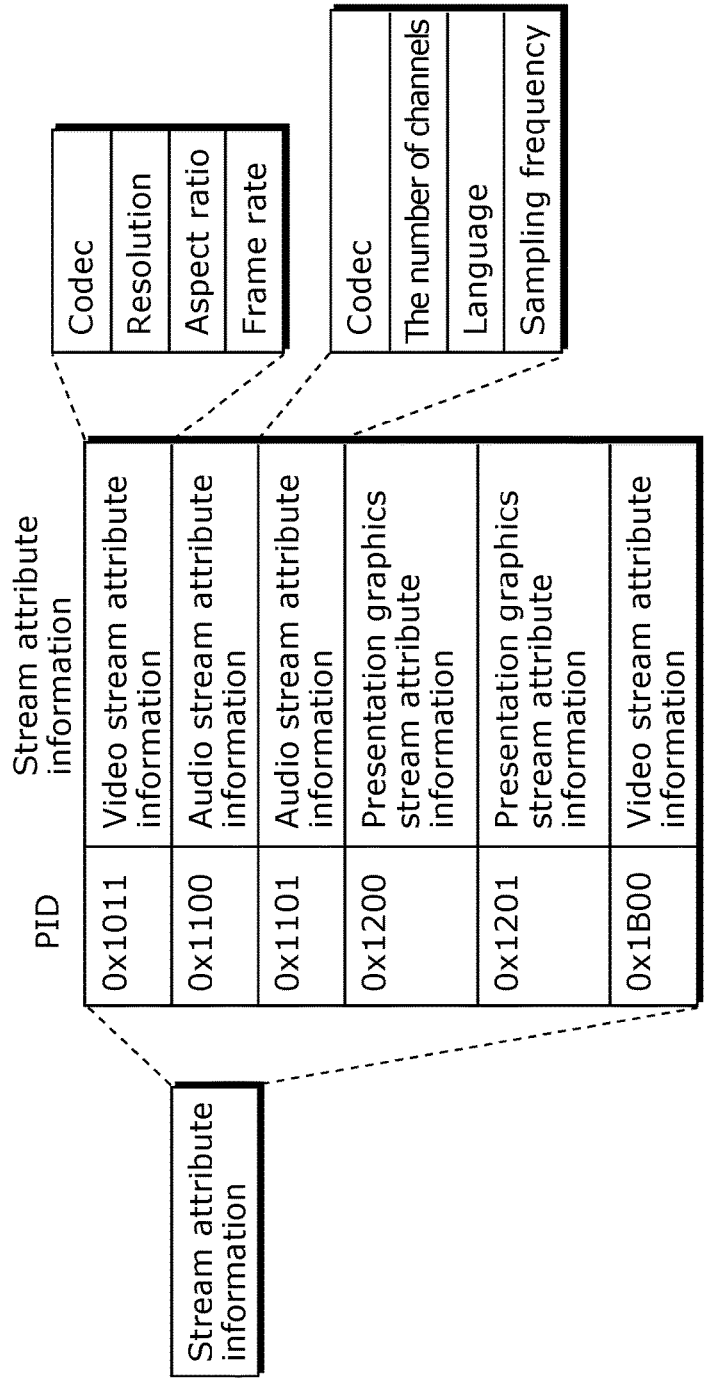
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
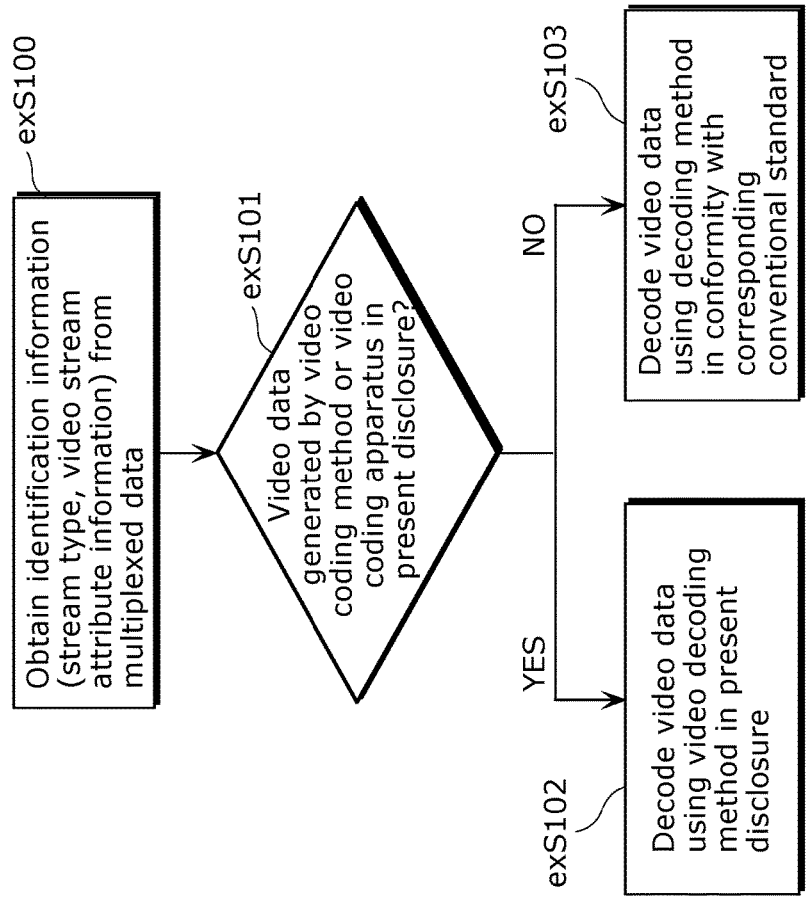
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

(Embodiment 5)

Figure 30:
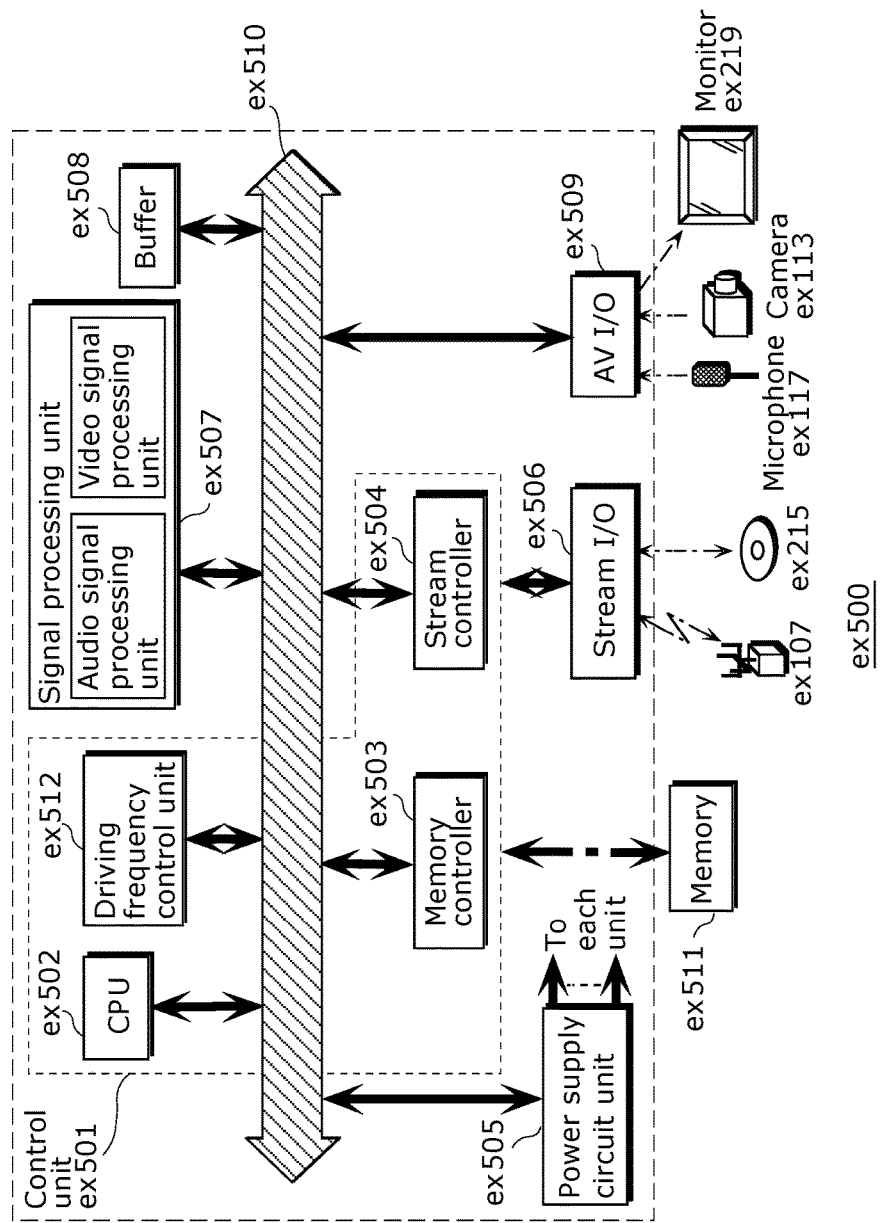
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

(Embodiment 6)

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
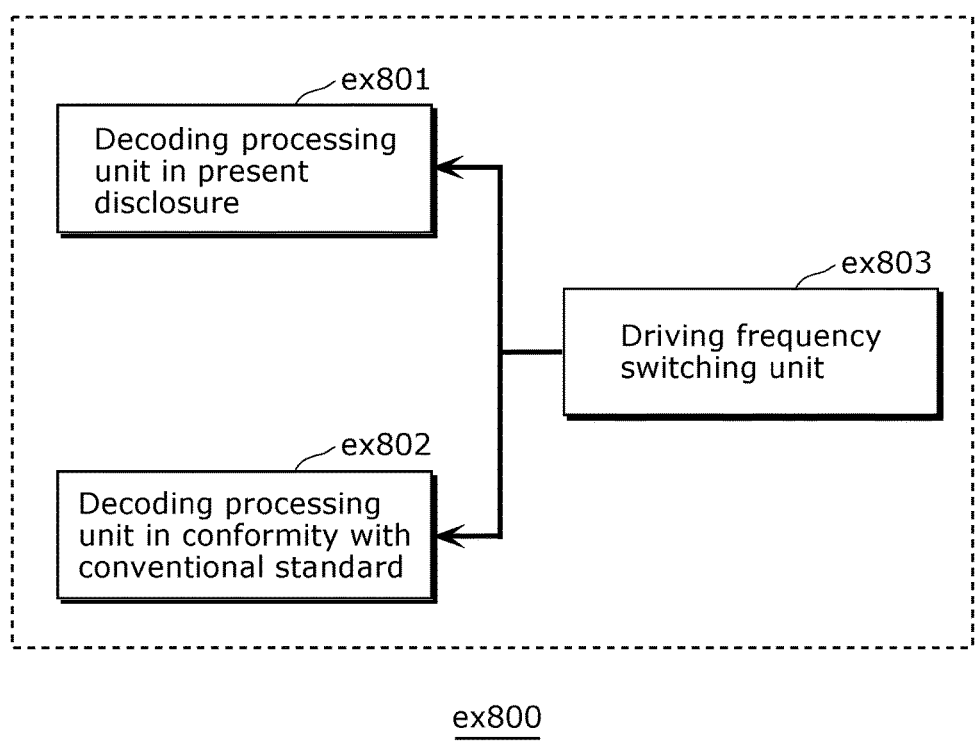
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
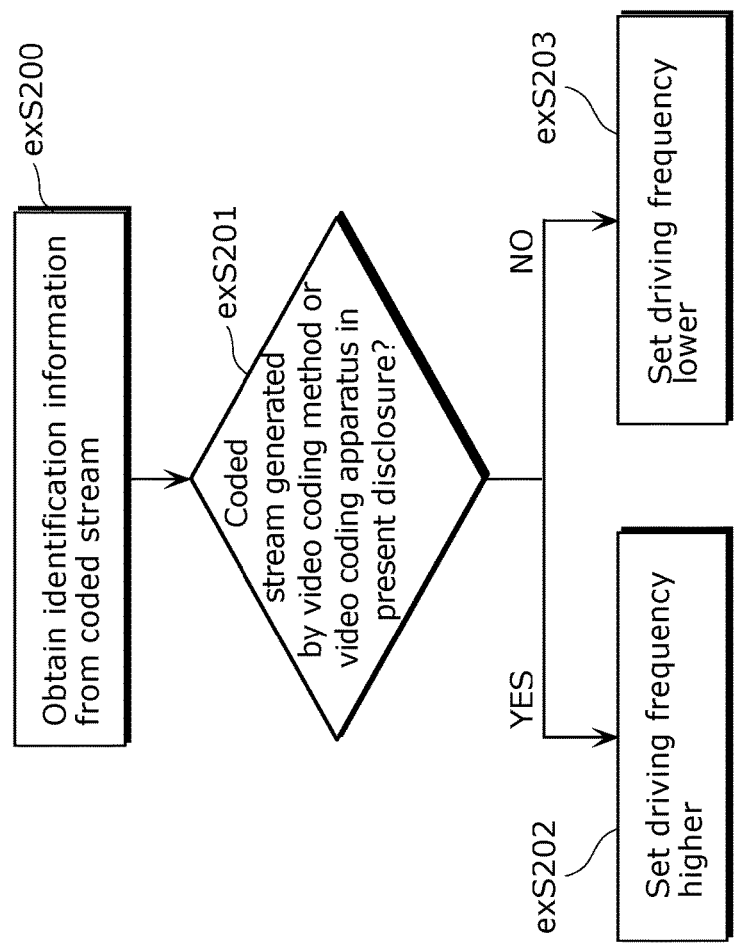
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 7)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
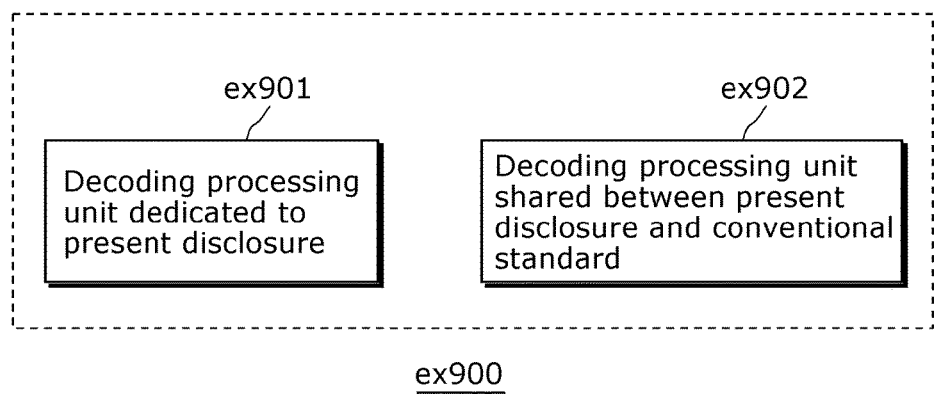
FIG. 34A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 34B:
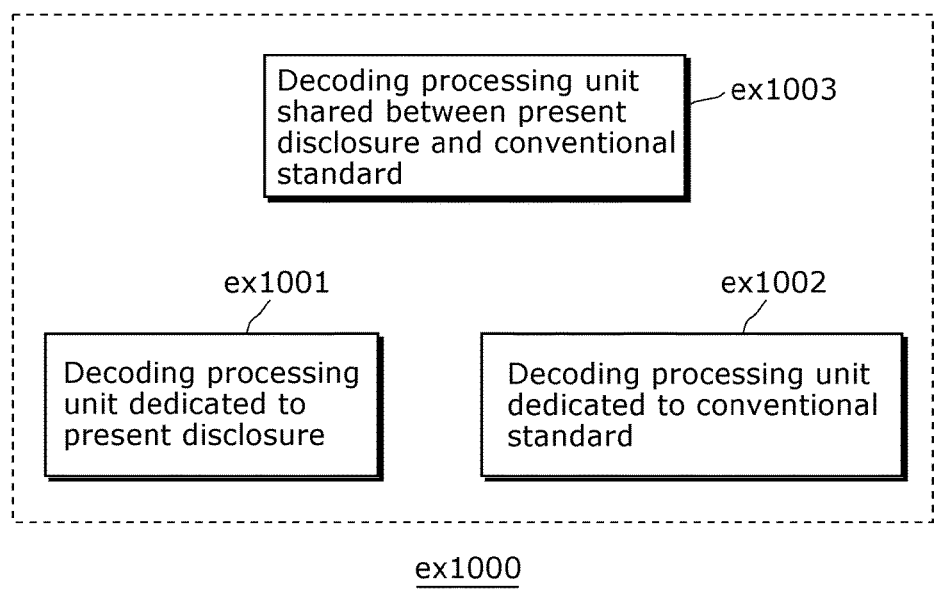
FIG. 34B is a diagram showing another example of a configuration for sharing a module of the signal processing unit.

Furthermore, ex1000 in FIG. 34B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The present disclosure can be applied to image coding methods, image decoding methods, image coding apparatuses, and image decoding apparatuses. The present disclosure is also applicable to high-resolution information display apparatuses or imaging apparatuses such as television sets, digital video recorders, in-vehicle navigation systems, portable phones, digital cameras, and digital camcorders, each of which includes an image coding apparatus.

The invention claimed is:

1. An image coding apparatus, comprising:
a processor; and
a memory storing thereon a computer program, which when executed by the processor, causes the processor to perform operations including:
performing Sample Adaptive Offset (SAO) processing on a luminance signal, a chrominance Cb signal, and a chrominance Cr signal which are included in a target block which is locally decoded;
performing arithmetic coding on a first flag indicating whether or not an SAO parameter for the target block is identical to an SAO parameter for a left neighboring block immediately left of the target block, the SAO parameter for the target block indicating details of the SAO processing;
performing arithmetic coding on the SAO parameter for the target block, when the SAO parameter for the target block is different from the SAO parameter for the left neighboring block; and
performing arithmetic coding on a second flag indicating whether or not the SAO parameter for the target block is identical to an SAO parameter for an upper neighboring block immediately above the target block,
wherein, in the performing of the arithmetic coding on the first flag, the arithmetic coding is performed on the first flag for the luminance signal, the chrominance Cb signal, and the chrominance Cr signal by using only a single first context,
in the performing of the arithmetic coding on the first flag and the performing of the arithmetic coding on the second flag, a same context determination method is used to determine both: the single first context to be used in the arithmetic coding on the first flag; and a single second context to be used in the arithmetic coding on the second flag,
the same context determination method is used to determine each of the single first context and the single second context to be shared for luminance signals, chrominance Cb signals, and chrominance Cr signals which are included in a same picture,
the single first context is used in common for coding a plurality of the first flag in a same picture,
the single second context is used in common for coding a plurality of the second flag in a same picture, and
in the performing of the SAO processing,
each of pixels included in the target block is classified to one of categories,
the each of the pixels is added with an offset value corresponding to the classified one of the categories, and
the SAO parameter includes: information indicating a method of classifying to the categories; and information indicating the offset value.

* * * * *